United States Patent [19]
Funawatari et al.

[11] Patent Number: 5,709,764
[45] Date of Patent: Jan. 20, 1998

[54] METHOD FOR ASSEMBLING A DISC-SHAPED RECORDING MEDIUM

[75] Inventors: Takatsugu Funawatari; Kenji Takahashi; Hiroyuki Ishikawa, all of Miyagi, Japan

[73] Assignee: Sony Corporation, Tokyo, Japan

[21] Appl. No.: 518,459

[22] Filed: Aug. 23, 1995

[30] Foreign Application Priority Data

Aug. 24, 1994 [JP] Japan ................................ 6-199556

[51] Int. Cl.⁶ ........................... B32B 31/12; B32B 31/28
[52] U.S. Cl. ........................ 156/275.7; 156/379.8; 156/538; 156/556; 156/580; 360/135; 396/290
[58] Field of Search ............................. 156/275.7, 379.6, 156/379.8, 275.5, 272.2, 293, 580, 556, 538; 360/135; 369/290

[56] References Cited

U.S. PATENT DOCUMENTS

| | | |
|---|---|---|
| 4,549,922 | 10/1985 | Oishi et al. .................. 156/299 X |
| 4,687,536 | 8/1987 | Hiramatsu et al. ............ 156/580 X |
| 4,704,181 | 11/1987 | Kubo . |
| 4,788,615 | 11/1988 | Oishi . |
| 4,836,890 | 6/1989 | Murata et al. ............... 360/135 X |
| 4,971,648 | 11/1990 | Doering .................... 156/379.8 X |
| 5,080,736 | 1/1992 | Matsui ...................... 156/556 X |

Primary Examiner—Melvin C. Mayes
Attorney, Agent, or Firm—Jay H. Maioli

[57] ABSTRACT

A method and apparatus for assembling a hub for magnetically chucking an optical disc on a disc table of a recording/reproducing apparatus under a force of magnetic attraction includes an assembly guide member having a first guide portion movable in a direction perpendicular to one major surface of the disc substrate so as to be engaged in a center opening in the disc substrate, and a second guide portion formed integrally with the first guide portion so that its center axis is aligned with the distal end of the first guide portion. The second guide portion is fitted in a spindle shaft opening in the hub. The assembly guide member its first guide portion fitted in the center opening for positioning the disc substrate and the second guide portion being engaged in this state in the spindle shaft opening for centering the disc substrate with respect to the hub. The disc substrate and the hub may be assembled together in the correctly centered state via the assembly guide member by a simplified operation with minimum cost, thus assuring reduction in investment cost and improved productivity. In addition, the centering between the disc substrate and the hub, which usually required time-consuming laborious operation, may be achieved easily by employing the assembly guide member, so that the assembly process may be simplified thus lowering the cost of the disc-shaped recording medium.

4 Claims, 18 Drawing Sheets

5,709,764

METHOD FOR ASSEMBLING A DISC-SHAPED RECORDING MEDIUM

BACKGROUND OF THE INVENTION

This invention relates to a method and apparatus for assembling a disc-shaped recording medium, such as an optical disc or a magneto-optical disc. More particularly, it relates to a method and apparatus for assembling on a disc substrate a hub adapted for magnetically chucking the optical disc on a disc table of a recording/reproducing apparatus under a force of magnetic attraction.

The optical disc is a recording medium having information signals, such as speech signals or video signals, recorded with a high recording density, or capable of recording the information signals with a high recording density, recorded thereon. When loaded on the recording/reproducing apparatus, the optical disc is loaded on the disc table thereof so as to be run in rotation at a high rpm. When the optical disc is rotated at a high rpm, the information signals recorded on a recording area formed on its major surface are reproduced by a laser light radiated from an optical pickup unit. On the other hand, recording of desired information signals is carried out on the optical disc capable of recording the information signals by application by an external magnetic field generating unit of an external magnetic field modulated in accordance with the information signals to be recorded, whilst the laser light radiated from the optical pickup device is radiated on the signal recording area of the disc.

Meanwhile, for correctly radiating the laser light on a fine recording track of the signal recording area of the optical disc rotated at a high rpm, it is necessary for the optical disc to be reliably unified to the disc table of the recording/reproducing apparatus and to be correctly chucked relative to the disc table with the center of rotation of the disc coincident with the axis of the disc table. As a chuck mechanism for the optical disc, a so-called magnet chuck system is employed, in which the force of magnetic attraction of a magnet is utilized for highly accurately positioning and positively chucking the optical disc and which renders it possible to reduce the thickness of the recording/reproducing apparatus.

The magnet chuck system includes a magnet provided on the disc table and a hub formed by a magnetic plate, such as a magnetic metal plate, which is mounted in a center opening of the disc. Therefore, when loaded on the recording/reproducing apparatus, the hub is attracted by the magnet and thereby unified to the disc table so as to be rotated at a high rpm by a disc rotating driving mechanism.

An optical disc 100, to which is applied the above-described magnet chuck system, is made up of a disc substrate 101 and a hub 102, as shown in FIGS. 30 to 32. The disc substrate 101 is formed by a disc-shaped transparent substrate, such as a glass plate or a plate of a transparent synthetic resin, such as polycarbonate resin. The disc substrate 101 has a center aperture 103 and an information recording area on its major surface for surrounding the center opening 103 for recording information signals thereon. A hub 102 is mounted in the center aperture 103 of the disc substrate 101. The hub 102 for magnet clamping is fabricated by drawing a magnetic plate, such as a magnetic metal plate, and includes a bottomed tubular fitting portion 104 and an outer flange portion 105 extended on the outer periphery of the opening of the fitting portion 104. The fitting portion 104 has an outer diameter substantially equal to the diameter of the center aperture 103 of the disc substrate 101. The fitting portion 104 has in its center a spindle shaft receiving opening passed through by a spindle shaft of the disc rotating driving unit of the recording/reproducing apparatus, although such spindle shaft receiving opening is not shown.

With the above-described optical disc 100, the disc substrate 101 and the hub 102 are assembled together by a method which is now to be described. The disc substrate 101 is run in rotation, as shown in FIG. 30, as it is supported by supporting means, not shown. A UV curable adhesive 107 is dripped on the outer periphery of the center aperture 103 of the disc substrate 101 from an adhesive dispenser 106 provided on a major surface of the disc substrate. Since the disc substrate 101 is run in rotation, the adhesive 107 is applied homogeneously around the center aperture 103 by the disc substrate 101 being run in rotation.

The hub 102 is mounted on the disc substrate 101 by having the fitting portion 104 introduced into the center aperture 103 from the major surface thereof coated with the adhesive 107, as shown in FIG. 31. With the fitting portion 104 of the hub 102 fitted into the center aperture 103, the hub 102 is strongly thrust against the major surface of the disc substrate 101, so that the adhesive 107 is extended along the inner surface of the outer flange 105.

Subsequently, a UV beam radiated from a UV beam radiating device 108 is radiated on the disc substrate 101, as shown in FIG. 32. The adhesive 107, coated on the outer rim of the center aperture 103, is cured by the radiated UV beam for securely bonding the opposite surface portions of the disc substrate 101 and the outer flange 105 of the hub 102 for completing the optical disc 100.

Meanwhile, for correctly radiating the laser light on a recording track of the information signal recording area of the optical disc 100 rotated at a high rpm, the optical disc 100 is chucked by having its center of rotation correctly coincident with the axis of the disc table of the disc rotating driving unit, as described previously. Thus the optical disc 100 needs to be assembled in a centered state, that is in a state in which the center of rotation of the information signal recording area of the disc substrate 101 having information signals recorded thereon is correctly coincident with that of the hub 102 as a chucked member.

For centering the disc substrate 101 relative to the hub 102, there are known two methods, that is a first method in which the center of rotation of the disc substrate 101 is calculated by utilizing a picture processing device, and a second method in which the center of rotation of the disc substrate 101 is calculated by counting traverse signals. That is, shown in FIG. 33, the basic concept of the first method is that an information signal recording area 110 of the disc substrate 101, that is an area carrying pits or grooves, differs in light reflectance from the area not carrying the pits or grooves, that is the inner most region or the outer most region of the disc substrate. The disc substrate 101 is set on an X-Y table, not shown, and the positions of at least three points on the same recording track of the information signal recording area 110, such as two points X1, X2 on the X-axis and two points Y1, Y2 on the Y-axis, as shown in FIG. 34, are read. The read-out points X1, X2, Y1 and Y2 are processed by a picture processing device, and the center position of these read-out points is calculated.

On the other hand, the hub 102 is arranged by being supported by supporting means, not shown, at a lower portion of the disc substrate 101. Thus the disc substrate 101 is centered relative to the hub 102 by controlled movement of the X-Y table controlled along the X-Y direction based upon a calculated output of the picture processing apparatus. The disc substrate 101 and the hub 102, centered relative to each other, are integrally assembled to each other by the method described previously.

The second method consists in rotationally driving the disc substrate 101, supported by a disc substrate driving device, not shown, and reading out information signals from an information signal recording area 110 provided on the disc substrate 101 by an optical pickup unit 111, as shown in FIG. 35. In such case, the optical pickup unit 111 is driven such that it is controlled in the focusing direction but not in the tracking direction, and counts traverse signals of the traversed recording tracks.

The amount of offset from the center of rotation of the disc substrate 101 is found from a product of the number of the traverse signals counted by the optical pickup device 111 and the track pitch. Thus the disc substrate 101 is centered with respect to the hub 102 by controlled movement of the X-Y table in the X-Y direction based upon the amount of correction corresponding to the amount of offset. The disc substrate 101 and the hub 102, centered relative to each other, are integrally assembled to each other by the method described previously.

With the above-described conventional centering method, in which the position of the center of rotation is directly found from the state of the information signal recording area 110 of the disc substrate 101, the hub 102 can be assembled on the disc substrate 101 by coinciding the center of the hub with the center of rotation of the information signal recording area 110, even if the center aperture 103 is offset from the center of the information signal recording area 110.

The above-described conventional centering methods suffer from the problem that the time required for searching the effective center of rotation of the disc substrate, more specifically, the time required for obtaining the picture information for the first method and the time required for counting the traverse signals of traversing the recording tracks by rotating the disc substrate for the second method, are protracted, while the time required for controlled movement of the X-Y table in the X-Y direction, is also protracted, thus lowering the productivity. In addition, the apparatus employed with the conventional centering method is extremely expensive.

OBJECTS AND SUMMARY OF THE INVENTION

It is therefore an object of the present invention to provide an inexpensive apparatus for assembling an optical disc whereby a disc substrate and a hub can be assembled in a highly centered state in a short time.

It is another object of the present invention to provide a method for assembling an optical disc whereby a disc substrate and a hub can be assembled in a highly centered state in a short time for reducing production cost of the optical disc.

The apparatus for assembling an optical disc according to the present invention includes a disc substrate having a center opening and an information recording area for concentrically recording information signals with the center opening as the center, and a hub assembled to the disc substrate by being fitted into the center opening from one major surface of the disc substrate so that the inner surface of the outer periphery thereof is unified to the outer periphery of the center opening. The apparatus includes an assembly guide member having a first guide portion movable in a direction perpendicular to one major surface of the disc substrate so as to be engaged in the center opening in the disc substrate, and a second guide portion formed integrally with the first guide member so that its center axis is aligned with the distal end of said first guide portion. The second guide portion is fitted in the spindle shaft opening in the hub. The assembly guide member has the first guide portion fitted in the center opening for positioning the disc substrate and the second guide portion engaged in this state in the spindle shaft opening for centering the disc substrate with respect to the hub.

A taper guide to be used at the time of engagement in the center opening is formed at the distal end of the first guide portion of the assembly guide member. Another taper guide to be used at the time of engagement in the spindle shaft opening is formed at the distal end of the second guide portion of the assembly guide member. The assembly guide member is run in rotation by driving means with the disc substrate assembled on the hub by the first guide portion being fitted in the center opening in the disc substrate and by the second guide portion being fitted in the spindle shaft opening in the hub.

The apparatus for assembling the disc-shaped recording medium includes a lower jig member having a guide opening for mounting the assembly guide member for reciprocating movement, and an upper jig member movable towards and away from the lower jig member. An end face of the lower jig member on which the guide opening is opened is arranged as a setting surface for a disc substrate. The upper jig member has a tubular disc substrate holding portion mating with the outer periphery of the center opening, and a hub thrusting portion mounted in the guide opening in the disc substrate holding portion for reciprocating movement and mating with the flange portion of the hub. The disc substrate and the hub are assembled on the assembly guide member by the first guide portion of the guide member protruded from the guide opening in the lower jig member being fitted in the center opening and the second guide portion being engaged in the spindle shaft opening. The disc substrate and the hub are assembled with respective centers in alignment with each other by the upper jig member being abutted against the jig member. The lower jig member has a suction opening, one end of which is connected to a vacuum suction device and the other end of which is opened on the peripheral region of the guide opening.

The apparatus for assembling the disc-shaped recording medium according to the present invention includes a lower jig member whose end face is constructed as a disc substrate setting surface configured for supporting the outer rim of the center opening of the disc substrate, and an upper jig member movable towards and away from the lower jig member and having a guide opening in which is mounted the assembly guide member for reciprocating movement. An end face of the upper jig member on which the guide opening is opened is configured as a hub thrusting portion for thrusting the flange portion.

The apparatus for assembling the disc-shaped recording medium according to the present invention includes a suction opening, one end of which is connected to a vacuum suction device and the other end of which is opened on the peripheral region of the guide opening. The lower jig member has a UV beam radiating unit in register with the outer periphery of the center opening in the disc substrate for opening on the disc substrate setting surface, and a UV beam radiating device in the UV beam radiating unit.

The method for assembling a disc-shaped recording medium including a disc substrate having a center opening and an information recording area for concentrically recording information signals with the center opening as the center, and a hub assembled to the disc substrate by being fitted into the center opening from one major surface of the disc substrate so that the inner surface of the outer periphery thereof is unified to the outer periphery of the center opening, employs an assembly guide member movable towards and away from the disc substrate in a direction at right angles to its major surface and having a first guide portion fitted into the center opening in the disc substrate and a second guide portion integrally and coaxially formed at the distal end of the first guide portion and fitted into a spindle shaft opening in the hub. The method includes a first step of assembling the disc substrate in position by inserting the first guide portion of the assembly guide member in the center opening and assembling the hub by fitting the second guide portion in the spindle shaft opening, a second step of coating an adhesive to the outer rim of the center opening in the disc substrate, and a third step of receding the assembly guide member for fitting the hub in the center opening in the disc substrate.

The method for assembling a disc-shaped recording medium employs a lower jig member having a guide opening for mounting the assembly guide member for reciprocating movement, and an upper jig member movable towards and away from the lower jig member. An end face of the lower jig member on which the guide opening is opened is arranged as a setting surface for a disc substrate. The upper jig member has a tubular disc substrate holding portion mating with the outer periphery of the center opening, and a hub thrusting portion mounted in the guide opening in the disc substrate holding portion and mating with the flange portion of the hub. The method includes a first step of assembling the disc substrate in position by inserting the first guide portion of the assembly guide member in the center opening and assembling the hub by fitting the second guide portion in the spindle shaft opening, a second step of coating an adhesive to the outer rim of the center opening in the disc substrate, a third step of lowering the assembly guide member along the guide opening in the lower jig member for abutting the disc substrate assembled on the assembly guide member against the disc setting surface of the lower jig member and lowering a disc substrate holding portion of the upper jig member towards said lower jig member in this state for clamping the disc substrate between the holding portion and the disc setting surface, a fourth step of lowering the assembly guide member further along the guide opening in the lower jig member for fitting the hub in the center opening in the disc substrate and lowering the hub thrusting portion of the upper jig member towards the lower jig member for thrusting the flange portion of the hub to the outer rim of the center opening of the disc substrate by the hub thrusting portion, and a fifth step of raising the upper jig member relative to the upper jig member for taking out the assembled disc-shaped recording medium.

The method for assembling a disc-shaped recording medium employs a lower jig member whose upper end face is constructed as a disc substrate setting surface configured for supporting the outer rim of the center opening of said disc substrate, and an upper jig member movable towards and away from the lower jig member and having a guide opening in which is mounted the assembly guide member for reciprocating movement. A lower end face of the upper jig member on which the guide opening is opened is configured as a hub thrusting portion for thrusting the flange portion. The method includes a first step of setting a disc substrate on the disc substrate setting surface of the lower jig member, a second step of lowering the assembly guide member along the guide opening in the upper jig member for fitting the first guide portion in the center opening in the disc substrate for positioning the assembly guide member on the disc substrate setting surface, a third step of coating an adhesive to the outer rim of the center opening in the disc substrate, a fourth step of fitting the second guide portion in the spindle shaft opening with the assembly guide member being raised along the guide opening in the upper jig member for assembling the hub to the assembly guide member, a fifth step of lowering the assembly guide member along the guide opening in the upper jig member for fitting the hub in the center opening in the disc substrate while lowering the hub thrusting portion towards the upper jig member for thrusting the flange portion of the hub by the hub thrusting portion against the outer rim of the center opening of the disc substrate, and a sixth step of raising the upper jig member relative to the lower jig member for taking out the assembled disc-shaped recording medium.

The method for assembling a disc-shaped recording medium in which the adhesive applied to the outer rim of the center opening of the disc substrate is a UV curable adhesive further includes the step of radiating a UV light beam for securing the disc substrate and the hub to each other with the flange portion of the hub being thrust against the outer peripheral surface of the center opening in the disc substrate by the hub thrusting portion of the upper jig member.

With the above-described apparatus for assembling the disc-shaped recording medium according to the present invention, the first guide portion of the guide member is fitted in the center opening in the disc substrate, while the second guide portion of the assembly guide member is fitted in the spindle shaft opening of the hub, so that the disc substrate and the hub are assembled together via this assembly guide member for assembling the correctly centered disc-shaped recording medium. The taper guides formed in the first and second guide portions of the assembly guide member operate as inserting guides and facilitate fitting of the first guide portion in the center opening in the disc substrate or the fitting of the second guide portion in the center opening in the disc substrate.

The disc substrate and the hub are assembled together in a relatively positioned state with the assembly guide member. The disc substrate is set and held on the disc substrate setting surface of the lower jig member via the assembly guide member. The upper jig member is abutted against the lower jig member for thrusting the hub thrusting portion against the outer flange portion of the hub for assembling the hub along the assembly guide member in a centered position in the center opening of the disc substrate. The suction opening in the disc substrate setting surface of the lower jig member operates for securely holding the disc substrate positioned by being engaged by the first guide portion of the assembly guide member.

The disc substrate set n the disc substrate setting surface of the lower jig member is positioned by the assembly guide member provided on the upper jig member being lowered towards the lower jig member so that the first guide portion is engaged in the center opening. The hub is assembled on the assembly guide member in the raised position by the second guide portion being fitted in the spindle shaft opening. The upper jig member is abutted against the lower jig member so that the hub thrusting portion thrusts the outer peripheral flange portion of the hub for assembling the hub in a centered state on the disc substrate setting surface along the assembly guide member. The suction opening opened in the second guide portion of the assembly guide member sucks and holds the hub which is assembled with the second guide portion fitted in the spindle shaft opening.

With the method for assembling the disc-shaped recording medium according to the present invention, the first guide portion of the guide member is fitted in the center opening in the disc substrate, while the second guide portion of the assembly guide member is fitted in the spindle shaft opening of the hub, so that the disc substrate and the hub are positioned relative to each other. Thus the disc substrate and the hub are assembled via the assembly guide member whereby the disc-shaped recording medium is assembled in the correctly centered state.

In addition, the assembly guide member, in which the disc substrate and the hub have been assembled together in the relatively positioned state, is lowered along the lower jig member so that the disc substrate is set and held on the disc substrate setting surface of the lower jig member. The upper jig member is abutted against the lower jig member so that the hub having its outer flange portion thrust by the hub thrusting portion is assembled on the disc substrate in the centered state in the center opening along the assembly guide member. The suction opening formed in the disc substrate setting surface of the lower jig member positively holds the disc substrate in which the fitting state of the first guide portion in the center opening has been canceled by the lowering of the assembly guide member.

According to the present invention, the disc substrate and the hub may be assembled together in correctly centered state via the assembly guide member by a simplified operation with the minimum cost thus assuring reduction in investment cost and improved productivity. In addition, the centering between the disc substrate and the hub, which usually required a time-consuming laborious operation, may be achieved easily by employing the assembly guide member, so that the assembly process may be simplified thus lowering the cost of the disc-shaped recording medium.

DESCRIPTION OF THE PREFERRED EMBODIMENTS

Figure 1:
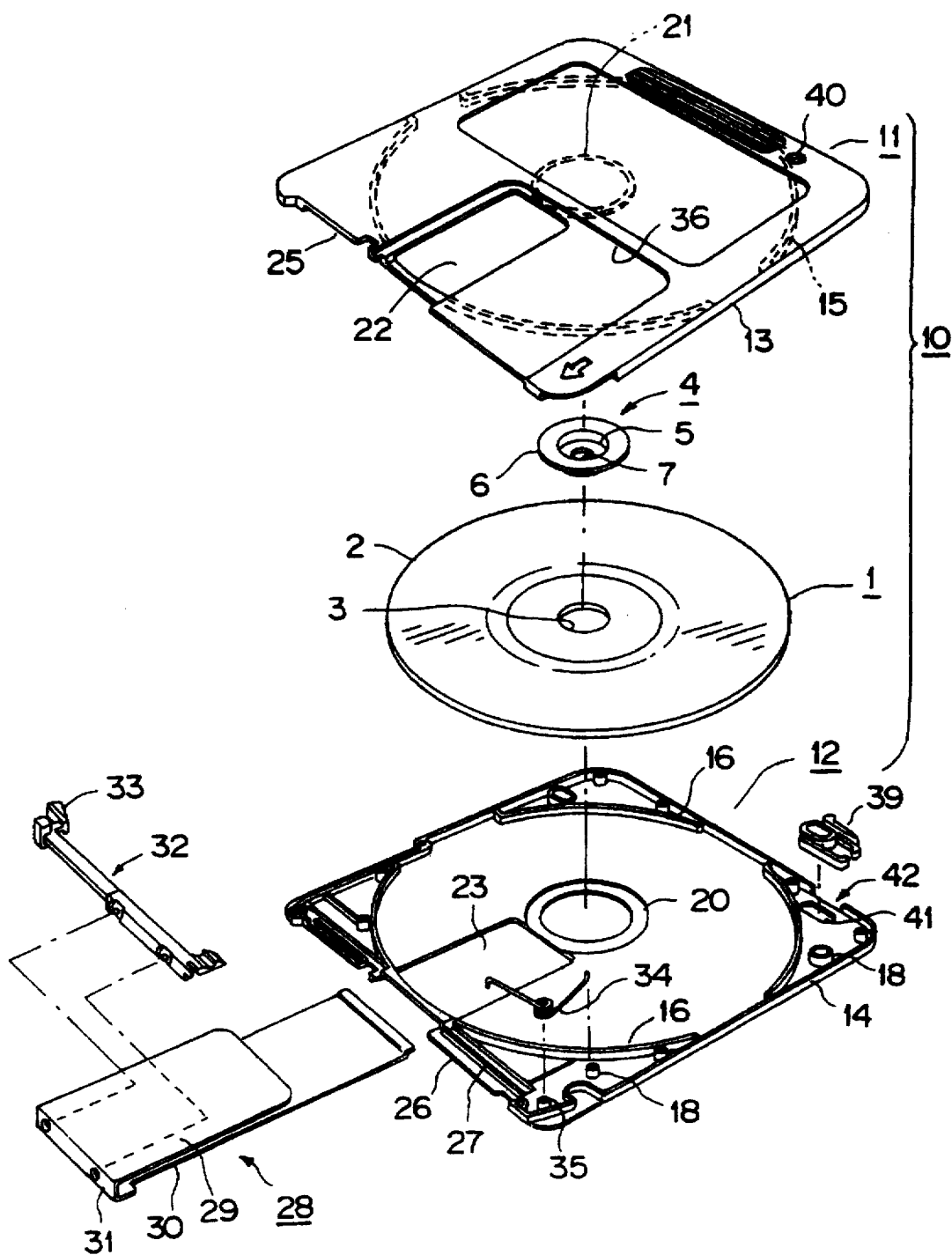
FIG. 1 is an exploded perspective view of a disc cartridge.

Referring to the drawings, illustrative embodiments of the present invention will be explained in detail.

Figure 2:
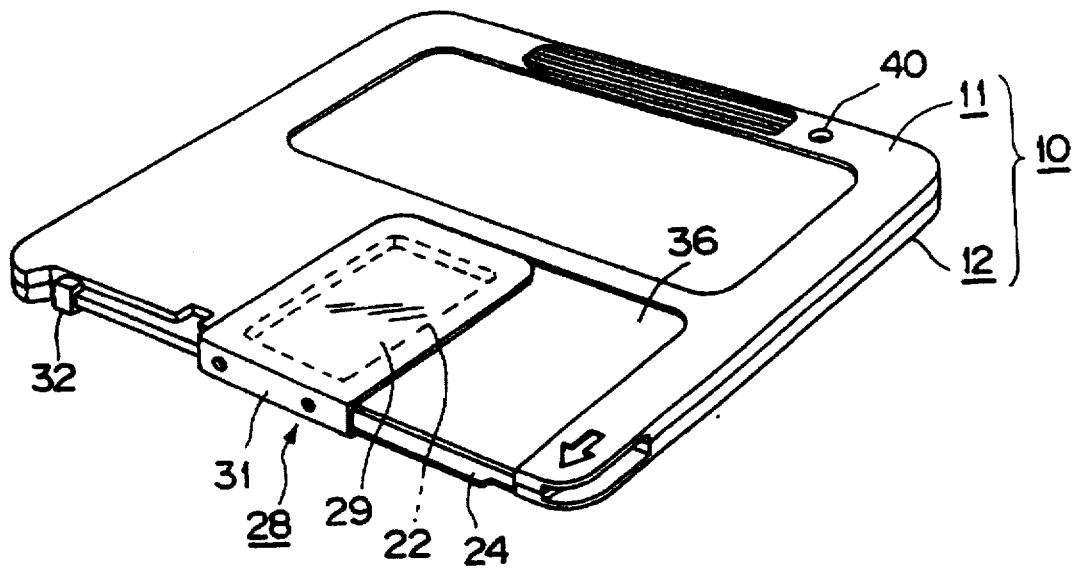
FIG. 2 is a perspective view of the disc cartridge, looking from a top surface thereof.
Figure 3:
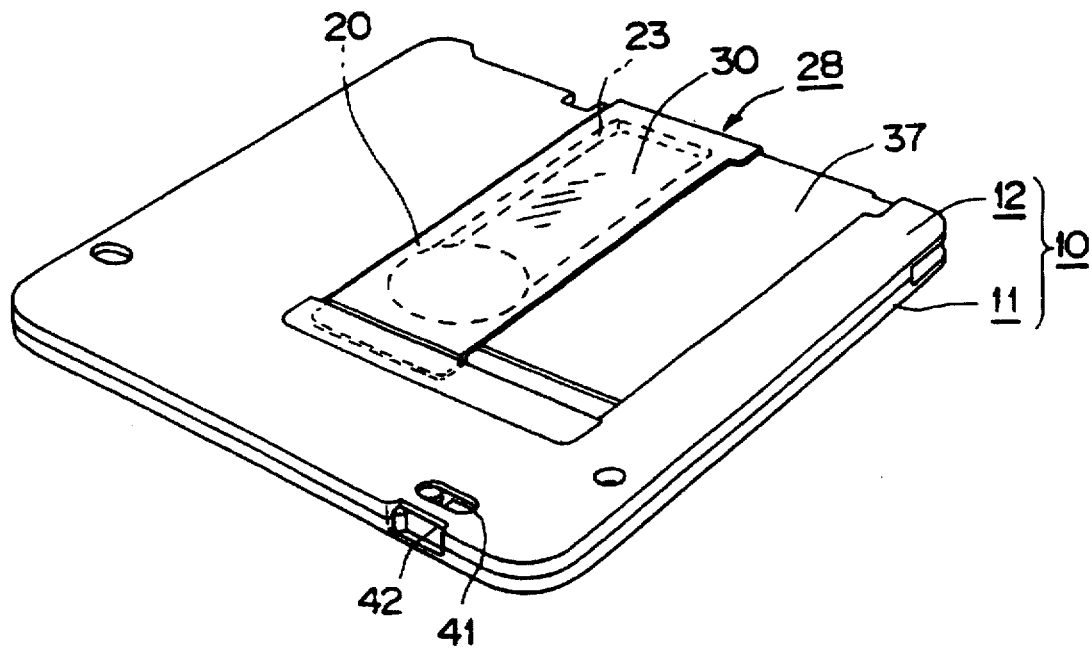
FIG. 3 is a perspective view of the disc cartridge, looking from its bottom surface.

As shown in FIGS. 1–3, a disc cartridge 10 is comprised of a cartridge casing (cartridge main body) made up of an upper cartridge half 11 and a lower cartridge half 12, each formed of a synthetic resin material, and an optical disc 1 rotatably housed within the cartridge casing. The upper cartridge half 11 and the lower cartridge half 12 are formed with a peripheral wall members 13, 14 which, when the upper cartridge half 11 and the lower cartridge half 12 are assembled together, the wall members 13, 14 are abutted against each other to form an outer wall of the cartridge casing.

The opposing inner surfaces of the upper and lower cartridge halves 11, 12 are formed with disc housing forming wall members 15, 16 formed as arcuate peripheral wall members disposed on a circumference of a circle circumscribing the wall members 13 14. When the upper and lower cartridge halves 11, 12 are assembled together, the disc housing forming wall members 14, 15 are abutted against each other to form a disc housing. In addition, the opposing inner surfaces of the upper and lower cartridge halves 11, 12 are formed with plural protrusions, with the protrusions on the lower half 12 being shown at 18.

The upper and lower cartridge halves 11, 12 are assembled together by abutting the peripheral wall members 13, 14 and the disc housing forming wall members 15, 16 and by fitting the protrusions together and bonding them together by ultrasonic welding to constitute the cartridge casing.

The lower half 12 is formed at a mid portion thereof with a circular opening 20. When the disc cartridge 10 is loaded on a recording/reproducing apparatus, a disc table of the recording/reproducing apparatus driving the optical disc 1 housed within the cartridge casing is intruded into the opening Specifically, the opening 20 exposes to outside a hub 4 formed of a magnetic material for magnet clamping which is mounted for closing a center aperture 3 of the optical disc 1 contained in the cartridge casing. An annular holding wall member 21 is provided at a mid portion of the upper cartridge half 11 in register with the opening 20. The holding wall 21 is abutted against the inner periphery of the optical disc 1 to permit smooth rotation of the optical disc 1 within the cartridge casing.

The upper and lower surfaces of the cartridge casing, that is, the upper and lower cartridge halves 11, 12, are formed with recording/reproducing apertures 22, 23, for exposing at least portions of the signal recording area of the optical disc 1 rotatably housed within the disc housing across the inner and outer rims of the disc. These recording/reproducing apertures 22, 23 are rectangular-shaped and extended from the positions close to the opening 20 and the holding wall section 21 to the front side of the cartridge casing at a mid portion in the transverse direction of the cartridge casing, as shown in FIG. 1.

The upper and lower cartridge halves 11, 12 are respectively formed with guide recesses 25, 26 on their front sides defining a guide groove 24 into which is intruded a shutter opening member of the recording/reproducing apparatus designed for shifting a shutter member 28 now to be explained. That is, with the upper and lower cartridge halves 11, 12 assembled together, the guide recesses 25, 26 make up a shutter opening member guide groove on the front surface of the cartridge casing.

For prohibiting dust and dirt from being intruded via the apertures 22, 23 into the disc housing so as to be deposited on the optical disc 1 housed in the cartridge casing (cartridge main body), a shutter member 28 is assembled on the cartridge main body for closing the apertures 22, 23. The shutter member 28 is fabricated by press-working a thin metal plate into substantially a U-shape and is comprised of a first shutter portion 29 and a second shutter portion 30, dimensioned to close the apertures 22, 23, respectively, and a connecting portion 31 interconnecting the proximal ends of the first and second shutters 29, 30. The second shutter portion 30 is dimensioned to close the opening 20 from the front side of the lower half 12 and closes the aperture 23 and the opening 20.

The shutter member 28 has a shutter guide member 32 on the inner surface of the connection portion 31. The shutter guide member 32 is formed substantially in the form of a rod of a synthetic resin material having a length substantially twice the width of the shutter member 28. An engagement portion 33 is formed integrally with one end of the shutter guide member 32. The shutter guide member 32 has its side opposite to the engagement portion 33 assembled to the inner surface of the connecting portion 31 of the shutter member 28 for constituting a shutter assembly. With the shutter assembly assembled on the cartridge main body, the shutter guide member 32 delimits a gap between the cartridge main body and the engagement portion 33. The gap is configured to be engaged by a shutter driving member of the recording/reproducing apparatus.

The shutter assembly is assembled on the cartridge main body by the first and second shutter portions 29, 30 of the shutter member 28 clamping the cartridge main body and by the shutter guide member 32 being engaged in the guide groove 24. When the disc cartridge 10 is loaded on the recording/reproducing apparatus, the shutter assembly is moved by the shutter driving member of the recording/reproducing apparatus from a first position of closing the apertures 22, 23 to a second position of opening the apertures 22, 23 by the first and second shutter portions 29, 30.

The shutter assembly is normally held by the elastic force of a spring 34 in the position of closing the apertures 22, 23 by the first and second shutter portions 29, 30 of the shutter member 28, respectively. The spring 34 is constituted by a coil base portion both ends of which are extended as shown. The spring 34 is assembled by having its coil base portion inserted into a front side one 35 of the plural protrusions 18 provided on the lower half 12. The spring 34, thus assembled on the lower cartridge half 12, has its both ends slightly compressed in order to store an elastic force. In this state, the spring 34 has its one end engaged with the shutter guide member 32 and has its other end engaged with the opposite side protrusion 18.

In a region of the upper and lower cartridge halves 11, 12 constituting the cartridge main body extending from the periphery of the apertures 22, 23 to one lateral sides of the halves 11, 12, along which the first and second shutter portions 29, 30 of the shutter member 28 are moved, and reaching the front side of the cartridge main body, there are formed recesses 36, 37 of substantially the same depth as the plate thickness of each of the first and second shutter portions 29, 30. These recesses 36, 37 render it possible to assemble the shutter member 28 so that its first and second shutter portions 29, 30 are mounted with the surfaces thereof flush with the surface of the cartridge main body. Thus the disc cartridge 10 is prevented from being increased in thickness due to assembling the shutter member 28 to the cartridge main body.

The disc cartridge 10 is provided with a mistaken recording inhibiting mechanism for inhibiting mistaken erasure of information signals recorded on the optical disc 1. This mistaken recording inhibiting mechanism is comprised of a mistaken recording inhibiting member 39 provided at a rear side corner of the lower cartridge half 12 associated with the front side corner thereof provided with the spring 34, and a mistaken recording detection opening 40 formed in the upper cartridge half 11.

The mistaken recording inhibiting member 39 is a substantially E-shaped member of a synthetic resin excellent in sliding properties and in resilient displacement properties which is comprised of a base portion, a pair of resilient click pieces and an operating piece extending parallel to one another. The base portion is substantially of an elliptical cross-section and is dimensioned to close the mistaken recording detection opening 40 as later explained. The lower half 12 is formed in its major surface with an elliptically-shaped guide opening 41 in register with the base portion of the mistaken recording inhibiting member 39. The upper cartridge half 11 is formed with click protrusions, not shown, resiliently engaged by the resilient clicks. The upper and lower cartridge halves 11, 12 are formed with a cut-out by partially removing portions of the peripheral wall members 13 and 14 in register with the operating piece of the mistaken recording inhibiting member 39.

The mistaken recording detection opening 40 is formed in the upper cartridge half 11 in register with one end of the guide opening 41 formed in the lower half 12. By the operating piece facing the opening 42, the mistaken recording inhibiting member 39 is switched between the first position closing the mistaken recording detection opening 40 by its base portion and the second position of opening the mistaken recording detection opening 40. When set to the first position of closing the mistaken recording detection opening 40 by the base portion, the mistaken recording inhibiting member 39 prohibits a mistaken, recording inhibiting mechanism of the recording/reproducing apparatus from being intruded into the mistaken recording detection opening 40 for enabling information signals to be recorded on the optical disc 1 housed within the cartridge main body.

When switched by the operating piece along the guide opening 41 so as to be set by the base portion to the second position of opening the mistaken recording detection opening 40, the mistaken recording inhibiting member 39 permits the mistaken recording detection mechanism of the recording/reproducing apparatus to be intruded into the mistaken recording detection opening 40 in order to disable recording of information signals on the optical disc 1 housed within the cartridge main body.

The optical disc 1, rotatably housed within the above-described disc cartridge 1, is made up of a disc substrate 2, and a hub 4 for the magnet clamp which is assembled into the center opening 3 of the disc substrate 2. The disc substrate 2 is constituted by stacking and bonding a pair of transparent disc-shaped disc substrate portions formed of glass or transparent synthetic resin, such as polycarbonate. The first disc substrate portion has an information signal recording area of pits or grooves on its major surface bonded to the second disc substrate portion which is formed spirally or concentrically and on which information signals are pre-recorded or are to be recorded. The second disc substrate portion is precisely bonded to the major surface of the first disc substrate portion, such as by a hot melt, for sheathing the information signal recording area, and has its major surface operating as a read-out surface for information signals. The disc substrate 2 may also be of a unitary structure.

The hub 4 is a member formed by press-working or drawing a magnetic plate, such as a magnetic metal plate, and is made up of a bottomed tubular fitting portion 5 of an outer diameter substantially equal to the inner diameter of the center opening 3 of the disc substrate 2 and an outer peripheral flange portion 6 formed for extending around the entire periphery of the opening in the fitting portion 5. The fitting portion 5 has a height slightly larger than the thickness of the disc substrate 2 and has a spindle shaft opening 7 at its center for accommodating a spindle shaft of the recording/reproducing apparatus, not shown. The outer flange portion 6 has an outer diameter slightly smaller than the inner most rim of the information recording area formed in the disc substrate 2.

Figure 4:
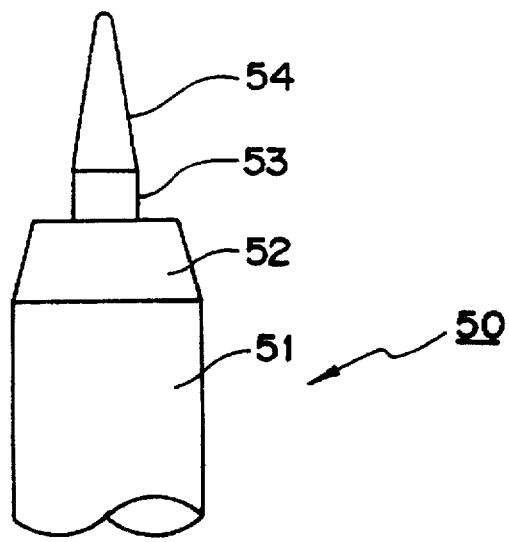
FIG. 4 is a front view showing essential portions of an assembly guide member provided in an assembling apparatus for a disc-shaped recording medium according to the present invention.

The disc substrate 2 and the hub 3 are assembled together by an assembly guide member 50 shown in FIG. 4. The assembly guide member 50 is made up of a first guide portion 51 as a basic shaft portion and a second guide portion 52 formed as one with the foremost part of the first guide portion 51. The first guide portion 51 has an outer size slightly larger than the diameter of the center opening 3 of the disc substrate 2 and has a taper guide 52 at its foremost part which is gradually decreased in outer diameter. Of course, the outer size of the front end face of the first guide portion 51 carrying the taper guide 52 is larger than the outer diameter of the second guide 53.

The second guide portion 53 has its outer diameter slightly larger than the diameter of the spindle shaft opening 7 of the hub 4. The second guide portion 53 is formed at the foremost part of the first guide portion 51 co-axially therewith.

Figure 5:
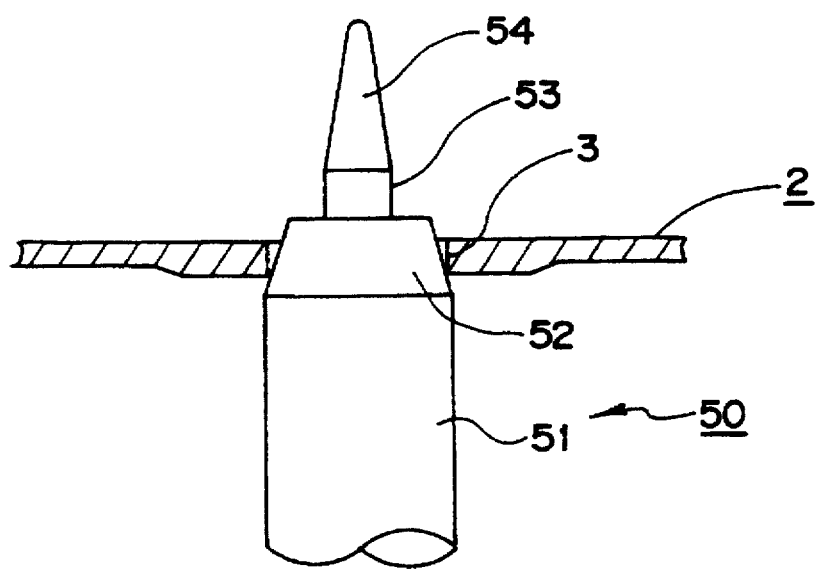
FIG. 5 illustrates the step of loading a disc substrate on the assembly guide member.

The above-described assembly guide member 50 is run into rotation by being supported by a driving unit, not shown, while being moved vertically in FIG. 4 for assembling the disc substrate 2 and the hub 4 together. FIGS. 5 to 9 illustrate basic assembly steps for the optical disc 1 with the aid of the assembly guide member 50. The disc substrate 2 is assembled to the assembly guide member 50 by the first guide portion 51 being fitted in the center opening 3, as shown in FIG. 5. The taper guide 52 facilitates fitting of the first guide portion 51 in the center opening 3, and operates for correcting the tolerance in outer diameter of the center opening 3 of the disc substrate 2 for assembling the disc substrate 2 with respect to the assembly guide member 50.

That is, with the disc substrate 2, manufactured extremely precisely, it is difficult to maintain its precision due to fluctuations in the molding condition or in the lot of the starting resin material, such that the diameter of the center opening 3 usually has some tolerance. Of course, the center opening 3 is molded to high circularity. When assembling the disc substrate 2 having some tolerance in the diameter of the center opening 3, the taper guide 52 operates for coinciding the center of the disc substrate 2 with that of the first guide portion 51.

Figure 6:
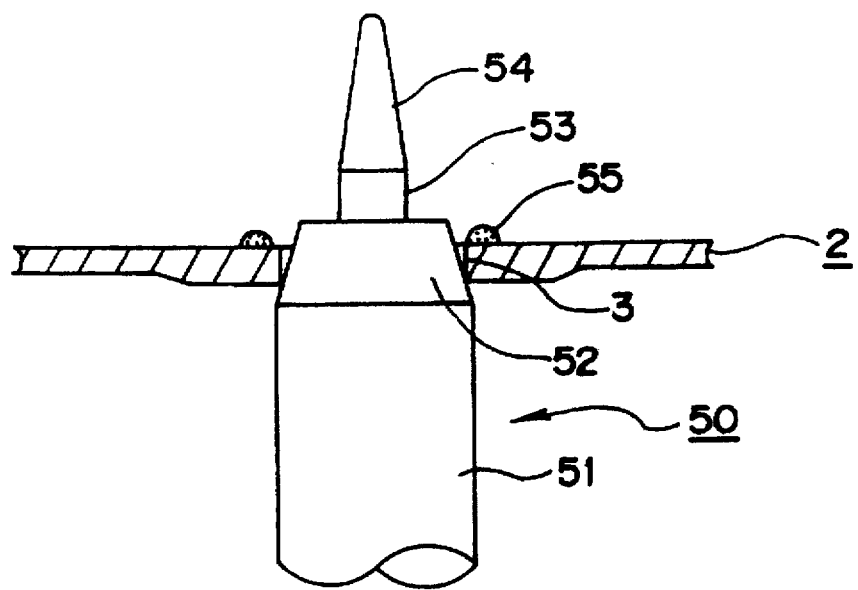
FIG. 6 illustrates the step of coating an adhesive on the disc substrate loaded on the assembly guide member.

The disc substrate 2, thus assembled in position on the assembly guide member 50 by the above-described operation, is held by a holding device, not shown. With the disc substrate 2 assembled on the assembly guide member 50, a UV curable adhesive 55 is applied to the outer periphery of the center opening 3, as shown in FIG. 6. The UV curable adhesive is applied from an adhesive supplying unit, not shown, provided above the major surface of the disc substrate 2, to a region between the center opening 3 and the information signal recording area. Since the disc substrate 2 is rotated via the assembly guide member 50, the adhesive is applied uniformly on the outer rim of the center opening 3.

Figure 7:
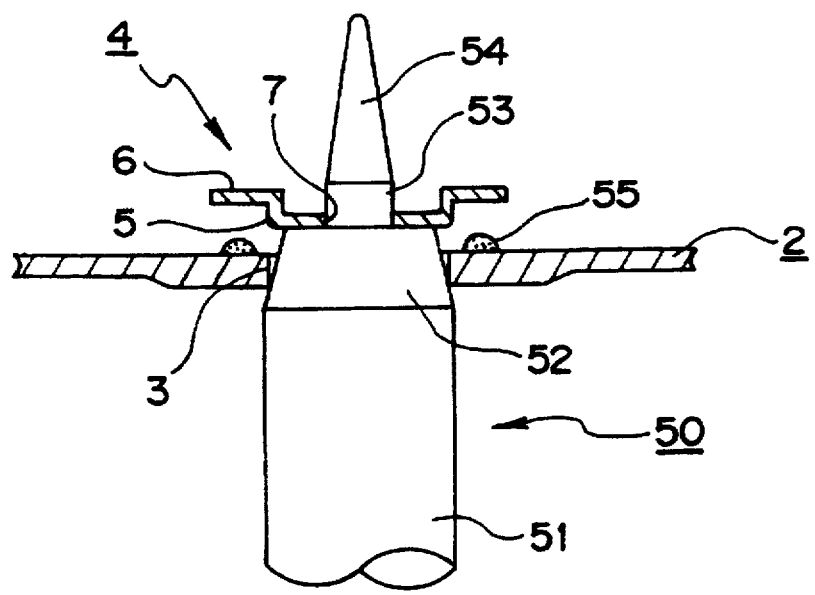
FIG. 7 illustrates the step of loading a hub on the assembly guide member.

The hub 4 is mounted on the assembly guide member 50 by the second guide portion 53 being fitted into the spindle shaft opening 7, as shown in FIG. 7. A taper guide 54 is provided in the second guide portion 53. Similarly to the taper guide 52 provided in the guide portion 51, the taper guide 54 facilitates fitting of the second guide portion 53 with the spindle shaft opening 7, while correcting the tolerance in the diameter of the spindle shaft opening 7 for assembling the hub 4 to the assembly guide member 50. Since the assembly guide member is made up of the first and second guide portions 51, 53 integrally and in axial alignment with each other, as described previously, the disc substrate 2 and the hub 4 are assembled to the guide member 50 with the center of the center opening 3 in register with the center of the spindle shaft opening 7, that is, in the centered state relative to each other.

Figure 8:
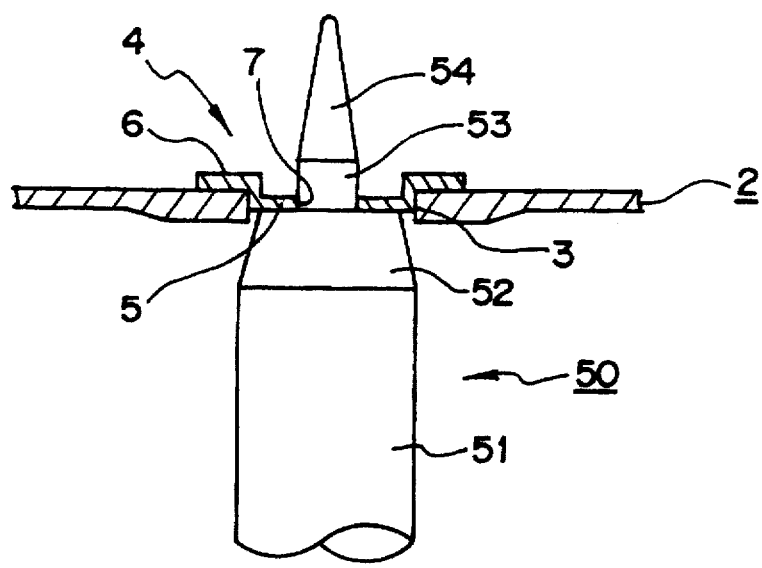
FIG. 8 illustrates the step of securing the hub on the assembly guide member.

The assembly guide member 50 is moved downward relative to the disc substrate 2 held by the holding device, so that the first guide portion 51 clears the center opening 3, as shown in FIG. 8. The hub 4, assembled to the assembly guide member 50 by the second guide portion 53 in the spindle shaft opening 7, has the fitting portion 5 fitted in the center opening 3 by such downward movement of the assembly guide member 50, while the outer flange portion 6 is unified to the outer rim of the center opening 3, thus assembling the hub relative to the disc substrate 2.

The hub 4 is assembled to the disc substrate 2, with the assembly guide member 50 as guide, in an extremely precise holding state, while the assembled state is held by a holding device, not shown. A UV beam radiating device, not shown, radiates a UV beam to the outer rim portion of the center opening 3 of the disc substrate 2 to which the hub 4 has been assembled as described above. The UV curable adhesive 55, coated on the outer rim of the center opening 3, is cured by the radiation of the UV beam for securing the outer flange portion 6 of the hub 4 to the major surface of the disc substrate 2 for completing the optical disc 1.

Figure 9:
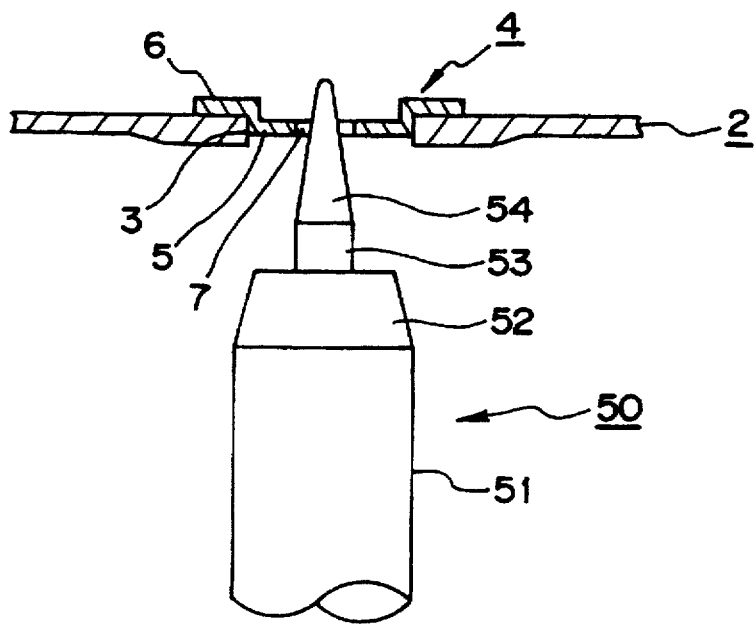
FIG. 9 illustrates the step of detaching the disc substrate having the hub assembled thereon from the assembly guide member.

The assembly guide member 50 is further moved downward, as shown in FIG. 9, so that the second guide portion 53 is detached from the spindle shaft opening 7 of the hub 4 to permit extraction of the optical disc 1 comprised of the disc substrate 2 and the hub 4 centered and assembled together.

Figure 10:
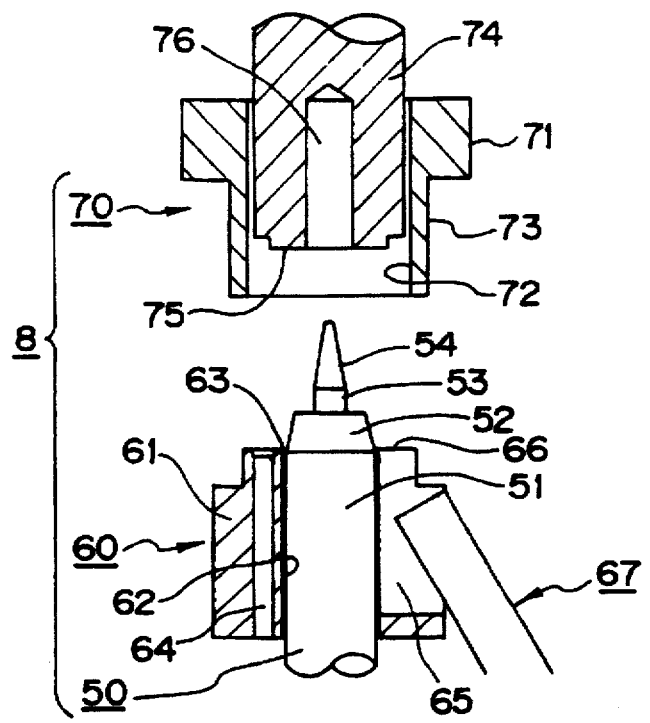
FIG. 10 is a longitudinal cross-sectional view showing the setting state of the assembling apparatus.
Figure 11:
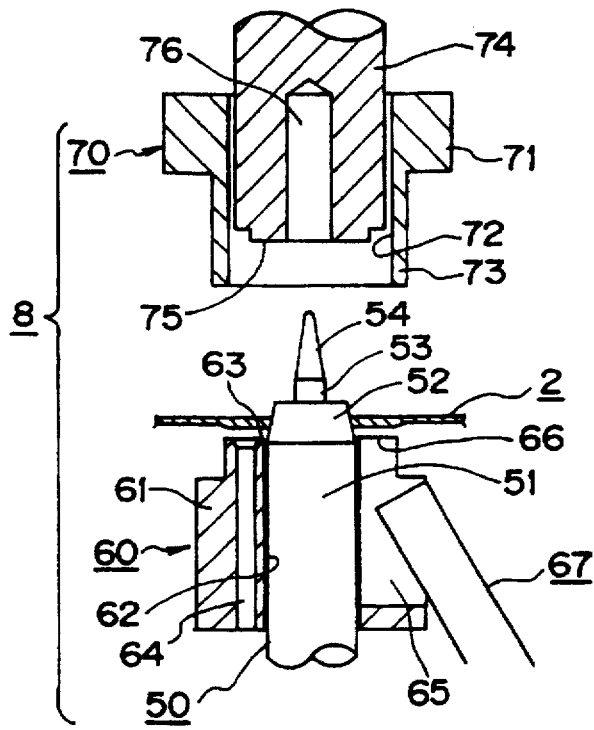
FIG. 11 illustrates the step of loading the disc substrate on the assembly guide member in the assembling apparatus shown in FIG. 10.
Figure 12:
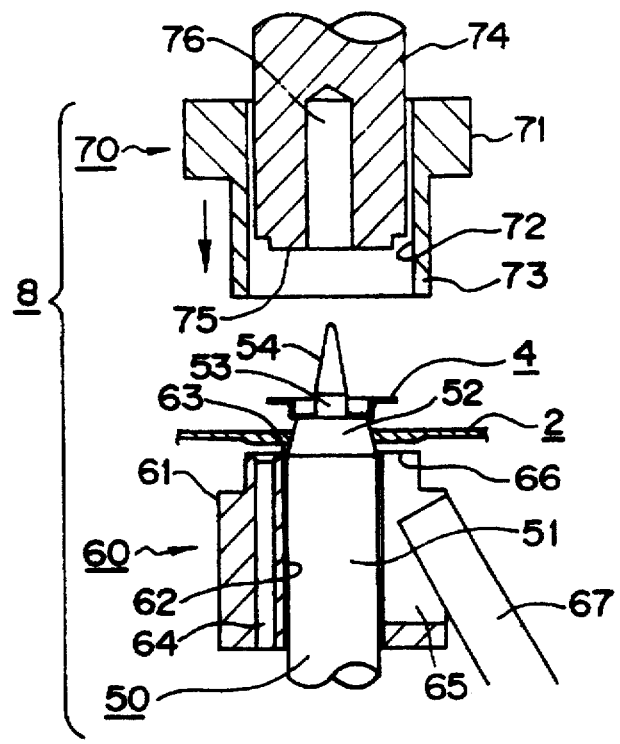
FIG. 12 illustrates the step of loading the hub on the assembly guide member in the assembling apparatus shown in FIG. 10.
Figure 13:
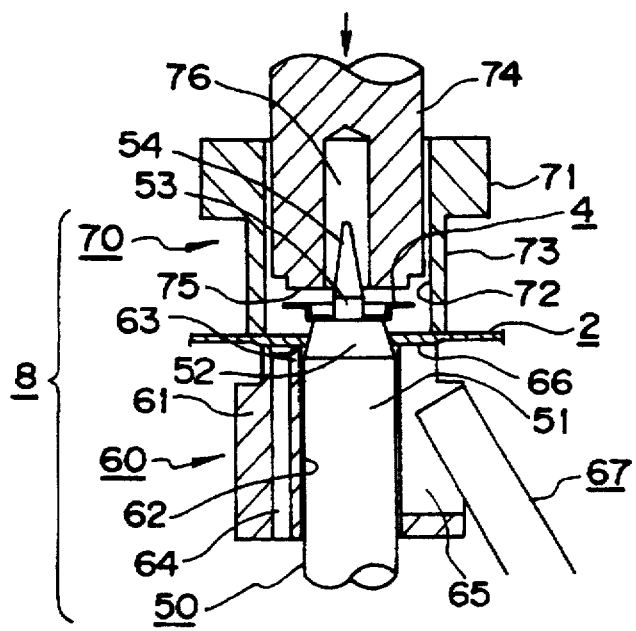
FIG. 13 illustrates the step of sucking the disc substrate loaded on the assembly guide member on a disc substrate setting surface of a lower jig member in the assembling apparatus shown in FIG. 10.

FIGS. 10 to 19 illustrate the assembly process of the optical disc 1 by an assembling device 8 for carrying out the basic assembling process as described above. The assembly device 8 is comprised of a lower jig 60 holding the assembly guide member 50 and an upper jig 70 adapted for being moved towards and away from the lower jig 60, as shown in FIG. 10. The lower jig 60 is made up of a tubular lower jig member 61, as a main part, and the aforementioned assembly guide member 50. The lower jig member 61 has a guide opening 62 extending in the height-wise direction and along which the assembly guide member 50 is moved axially. The lower jig member 61 has its upper end face as a disc substrate setting surface 63 and includes plural suction openings 64 opened on the disc substrate setting surface 63 and a UV beam radiating unit 65 having a UV beam radiating device 67.

The disc substrate setting surface 63, constituted as a horizontal surface of higher horizontality, has an outer size large enough to support a region between the center opening 3 of the disc substrate 2 and the information signal recording area, and carries the center guide opening 62. A plurality of suction openings 64 are opened on the disc substrate setting surface 63 for encircling the guide opening 62. These suction openings 64 are connected at the lower ends thereof to a vacuum suction system, not shown. Thus, on actuation of the vacuum suction device, the disc substrate setting surface 63 of the lower jig 60 operates as a suction surface.

On the other hand, the UV beam radiating unit 65 is comprised of a space provided in the lower jig member 61 so as to be opened in the lateral surface of the lower jig member 61 and so as to be opened at its upper portion on the disc substrate setting surface 63 for operating as UV beam radiating opening 66. The UV beam radiating device 67 is mounted in the UV beam radiating unit 65 with the radiating surface thereof directed to the disc substrate setting surface 63 from the lateral surface of the lower jig member 61.

The upper jig 70 is made up of a tubular first upper jig member 71 having a vertically extending guide opening 72 and a second upper jig member 74 assembled for vertical movement in the guide opening 72 in the first jig member 71. The tubular flange portion of the first upper jig member 71 carrying the guide opening 72 has an outer diameter slightly larger than the upper end of the lower jig member 61 constituting the disc substrate setting surface 63. The first upper jig member 71 operates as a disc substrate thrusting portion 73, as will be explained subsequently. The first upper jig member 71 is driven by driving means, not shown, in a vertical direction towards and away from the lower jig member 61.

The second upper jig member 74 is constituted by a piston rod member having an outside diameter slightly larger than the diameter of the guide opening 62 of the lower jig member 61, and is driven vertically in the guide opening 72 in the first upper jig member 71 by a driving mechanism, not shown. The lower end of the second upper jig member 71 operates as a hub thrusting portion 75, as will be explained subsequently. The second upper jig member 74 has an axial clearance opening 76 opened on the hub thrusting portion 75. The clearance opening 76 is formed in the second upper jig member 74 with a diameter and a length sufficiently larger than the axial size of the second guide portion 53 of the assembly guide member 50.

An adhesive supplying unit, not shown, is provided on the upper lateral side of the lower jig 60. When the disc substrate is assembled on the assembly guide member 50 built into the lower jig member 61 for vertical movement, as will be explained subsequently, the adhesive supplying device is intruded into a space between the lower jig 60 and the upper jig 70 for dripping the UV curable adhesive to the outer rim of the center opening 3 of the disc substrate 2. At this time, the assembly guide member 50 is run in rotation by a driving mechanism, not shown, for rotating the disc substrate 2 in unison therewith for allowing the dripped UV curable resin to be uniformly coated on the outer rim of the center opening 3. After the end of the coating step of the UV curable adhesive to the disc substrate 2, the adhesive supplying device is retracted to a lateral area outside the range of movement of the upper jig 70.

With the above-described assembly device 8, the upper jig 70 is raised with respect to the lower jig 60. As for the assembly guide member 50, the upper end of the first guide portion 51, is protruded and exposed from the upper end portion of the first guide portion 51. That is, the taper guide 52 is protruded and exposed from the disc substrate setting surface 63. The disc substrate 2 is assembled to the assembly guide member 50 with the first guide member 52 introduced into the center opening 3. The UV curable resin is coated in a uniform state on the outer rim of the center opening 3 by the above-described adhesive supplying device, as shown in FIG. 6. The hub 4 is mounted on the assembly guide member 50 by having the first guide portion 53 being fitted in the spindle shaft opening 7, as shown in FIG. 7. The disc substrate 2 and the hub 4 are assembled on the assembly guide member 50 with the respective center positions coincident with each other.

With the disc substrate 2 and the hub 4 mounted on the guide member 50, a driving system, not shown, is actuated for lowering the first upper jig member 71 and the second upper jig member 74 towards the lower jig 60. Prior to the downward movement of the upper jig 70, a vacuum suction system, not shown, is driven for operating a force of suction on the disc substrate setting surface 63 of the lower jig member 61, and for lowering the assembly guide member 50 by a driving systems not shown.

Figure 15:
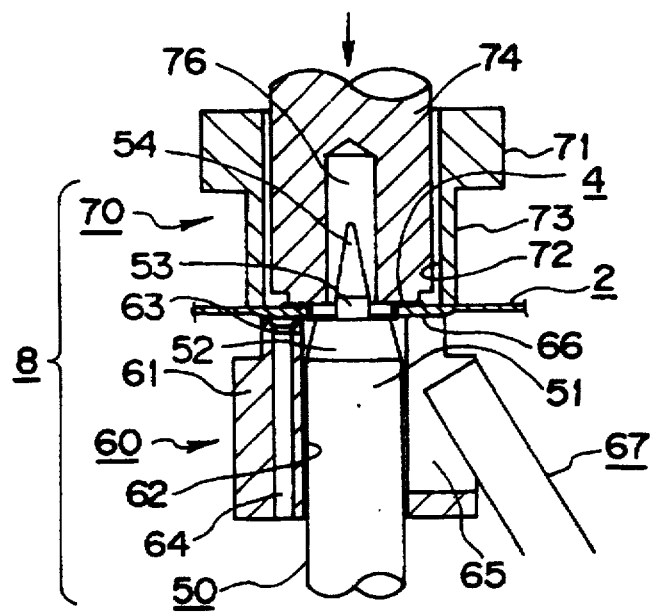
FIG. 15 illustrates the step of pressing the hub onto the disc substrate by a hub pressing member of an upper jig member in the assembling apparatus shown in FIG. 10.

This releases the fitting state of the first guide portion 51 of the assembly guide member 50 in the center opening 3 while sucking the disc substrate 2 onto the disc substrate setting surface 63. As for the first upper jig member 71, the disc substrate thrusting portion 73 thrusts the disc substrate 2 against the disc substrate setting surface 63 along the assembly guide member 60, as shown in FIG. 15. The disc substrate 2 is clamped by the disc substrate thrusting portion 73 and the disc substrate setting surface 73 of the lower jig member 61 so as to be held in position on the disc substrate setting surface 63 under the force of suction exerted via the suction opening 64. When the upper jig 70 has been lowered, the assembly guide member 50 is positioned in the clearance opening 76.

Figure 14:
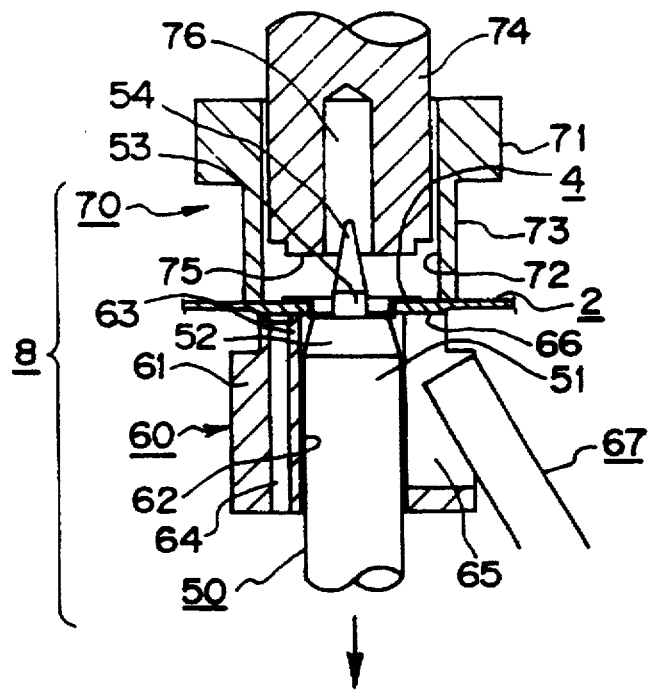
FIG. 14 illustrates the step of securing the hub to the disc substrate in the assembling apparatus shown in FIG. 10.

The assembly guide member 50 is then lowered by a driving mechanism, not shown. This releases the fitting state of the frost guide portion 51 of the assembly guide member 50 in the center opening 3. However, since the disc substrate 2 is held in position on the disc substrate setting surface 63 under the operation of the disc substrate thrusting portion 73 of the first upper jig member 71 and the suction opening 64, the disc substrate 2 is prohibited from being moved in idleness. The assembly guide member 50 is further lowered until the hub 4 built in the assembly guide member 50 is fitted into the center opening 3 of the disc substrate 2, as shown in FIG. 14.

Figure 16:
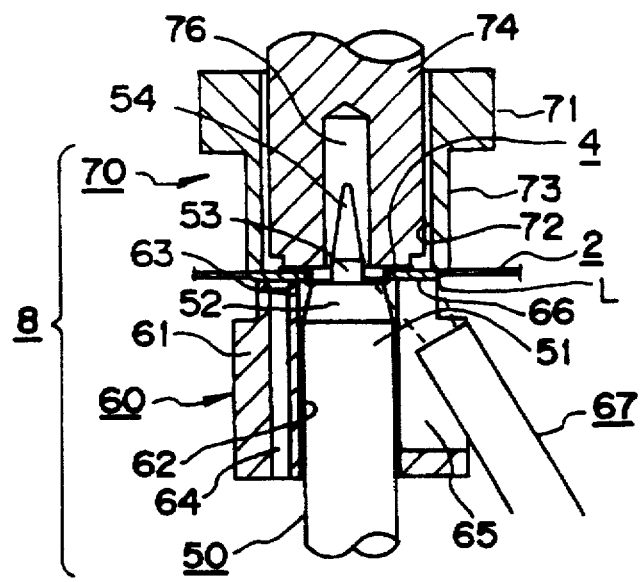
FIG. 16 illustrates the step of radiating UV rays to the disc substrate from a UV radiating unit built in the lower jig member in the assembling apparatus shown in FIG. 10.

With the hub 4 assembled to the disc substrate 2, the second upper jig member 74 of the upper jig 70 is lowered along the guide opening 72 in the first upper jig member 71 by driving means, not shown, until the hub thrusting portion 75 thrusts the outer flange portion 6 of the hub 4 towards the disc substrate 2, as shown in FIG. 15. The disc substrate 2, carrying the hub 4, is irradiated with a UV light beam L from the UV light beam radiating device 67 provided in the UV light beam radiating unit 65 of the lower jig member 61. The UV light beam L is radiated on the outer periphery of the center opening 3 of the disc substrate 2 via the UV light beam radiating port 66 formed on the disc substrate setting surface 63, as shown in FIG. 16. The UV curable adhesive, coated on the outer periphery of the center opening 3, is cured by radiation of the UV beams for securing the outer peripheral flange portion 6 of the hub 4 to the major surface of the disc substrate 2 for completing the optical disc 1.

Figure 17:
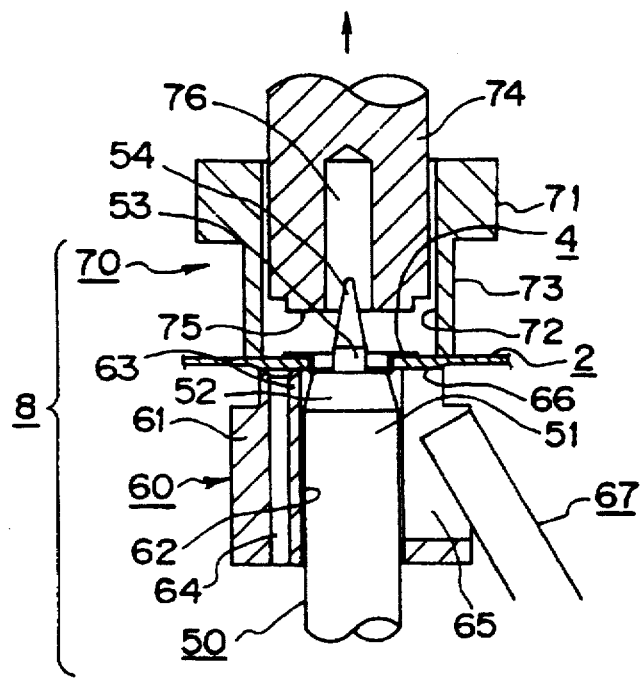
FIG. 17 illustrates the step of releasing the hub from pressure by the lower jig member in the assembling apparatus shown in FIG. 10.

On completion of the assembling of the hub 4 to the disc substrate 2 by the above process, driving means, not shown, of the assembling device 8 is actuated for lifting the upper jig member 74 of, as shown in FIG. 17. In this state, the optical disc 1 is pressed by the disc substrate thrusting portion 73 of the first upper jig member 71 against the disc substrate setting surface 63 of the lower jig member 61.

Figure 18:
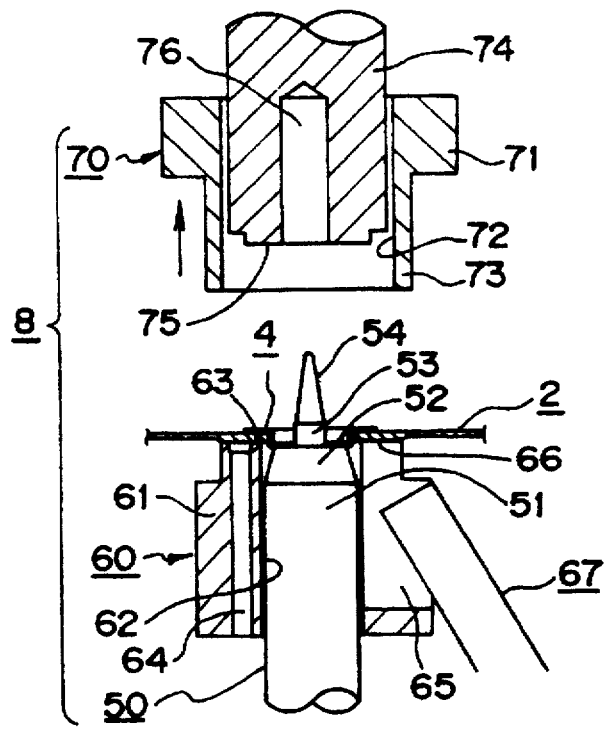
FIG. 18 illustrates the step of releasing the disc substrate from pressure exerted by the disc substrate pressing member of the upper jig member in the assembling apparatus shown in FIG. 10.
Figure 19:
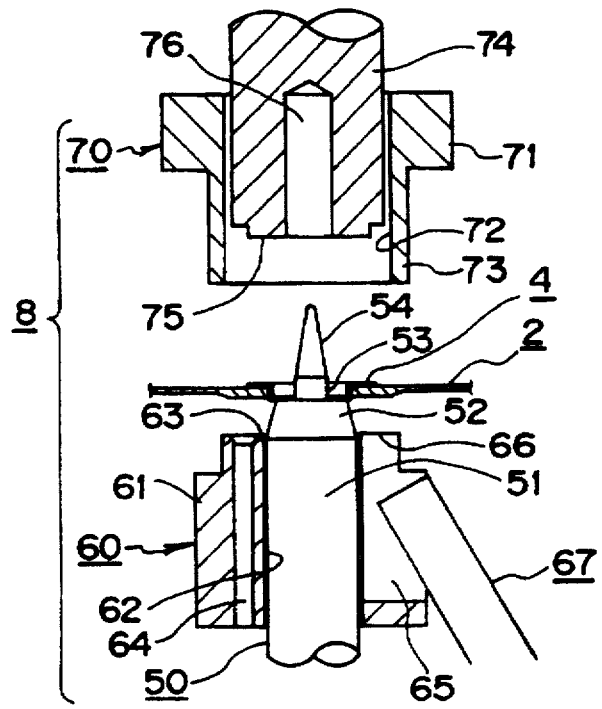
FIG. 19 illustrates the step of taking out the optical disc comprised of the disc substrate and the hub assembled together in the assembling apparatus shown in FIG. 10.

The upper jig 70 is separated away from the lower jig 60 by the first upper jig member 71 being uplifted by driving means, not shown, as shown in FIG. 18. The optical disc 1, now carrying the disc substrate 2 and the hub 4, is released from the state of being sucked on to the disc substrate setting surface 63 of the lower jig 60, since the vacuum suction device is halted. Thus the assembly guide member 50 is uplifted along the guide opening 62 of the lower jig member 61, with the upper jig being now floated above the lower jig 60, as shown in FIG. 19. The optical disc 1 can now be taken out of the assembly device 8.

Figure 20:
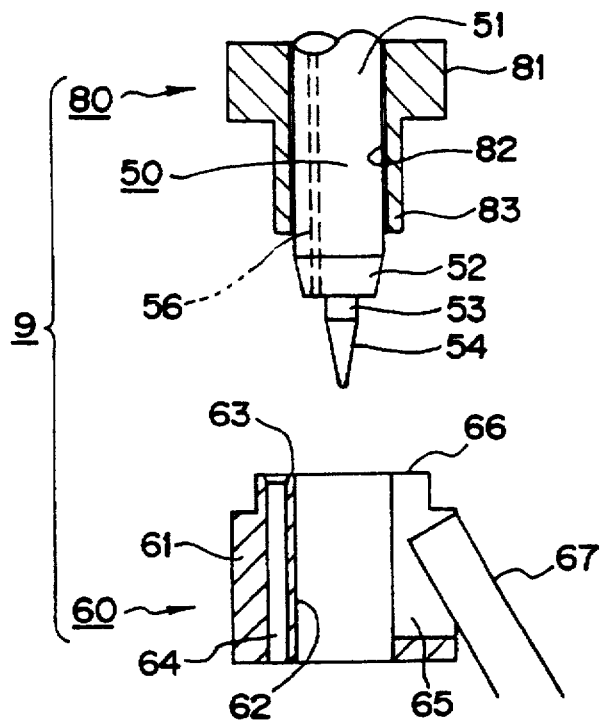
FIG. 20 is a longitudinal cross-sectional view showing the setting state of essential portions of an assembling apparatus for a disc-shaped recording medium according to a second embodiment of the present invention.

FIGS. 20 to 29 illustrate the assembly steps by an assembly device 9 of the second embodiment for realization of the above-described basis assembly process. The assembly device 9 is made up of an assembly device, a lower jig 60 and an upper jig 80 as shown in FIG. 20. The assembly guide member 50 is vertically movable towards the upper jig 80. With the assembly device 8 of the first embodiment, the lower jig member 61 constituting the lower jig 60 operates as a guide opening to permit vertical movement of the assembly guide member 50. In the assembly device 9 of the present embodiment, the guide opening 62 operates as a clearance opening for the assembly guide member 50.

Although the lower jig member 61 is of the same construction as the lower jig member of the previously described first embodiment, it may also be constructed uniquely. In such case, the lower jig member 61 naturally needs to be provided at least with a clearance opening 62 for the assembly guide member 50, disc substrate setting surface 3, holding mechanism for the disc substrate 2 and with the a UV light beam radiating unit 65 for the UV light beam radiating device 67.

The assembly guide member 50 is moved vertically in a guide opening 82 by driving means, not shown, in an upper jig member 81 which will be explained subsequently. The assembly guide member 50 holds the hub 4 by fitting the second guide portion 53 in the spindle shaft opening 7 in the assembly process as later explained, and has an axially extending suction opening 56 for prohibiting detachment of the hub 4. The suction opening 56 has its one end opened in the distal end of the first guide portion 51 for surrounding the second guide portion 53 and has its other end connected to a vacuum suction system, not shown. Thus the end face of the first guide portion 51 operates as a suction surface for the hub 4. Meanwhile, it suffices if the suction opening 56 is so designed as to develop a force of suction sufficient to transiently hold the hub 4 relatively light in weight to the assembly guide member 50. The number of the suction holes 56 may be set arbitrarily.

The upper jig 80 is made up of a tubular upper jig member 81 and an assembly guide member 50 movably mounted in a vertically extending guide opening 82 formed in the upper jig member 81. The upper jig member 81 is moved by driving means, not shown, in a direction towards and away from the lower jig member 60. The upper jig member 81 is integrally formed with a hub thrusting portion 83 in its lower portion. The hub thrusting portion 83 has an outer diameter substantially equal to the outer diameter of the outer flange portion 6 of the hub 4.

Similarly to the assembly device 8 of the first embodiment, the assembly device 9 is provided with an adhesive supplying device, not shown, at an upper portion of the lower jig 60. When the disc substrate 2 is assembled on the lower jig member 61 as later explained, the adhesive supplying device is intruded into a space between the lower jig 60 and the upper jig 80 for dripping the UV curable adhesive to the outer rim of the center opening 3 of the disc substrate 2. The lower jig member 60 is provided with a UV radiating unit 65 formed as a UV light radiating port 66 by being opened on the lateral surface of the lower jig member 60 and by being opened at an upper portion thereof in the disc substrate setting surface 63. A UV light beam 67 is mounted on the UV light beam radiating unit 65 with its radiating surface being directed from the lateral side of the lower jig member 61 towards the disc substrate setting surface 63.

Figure 21:
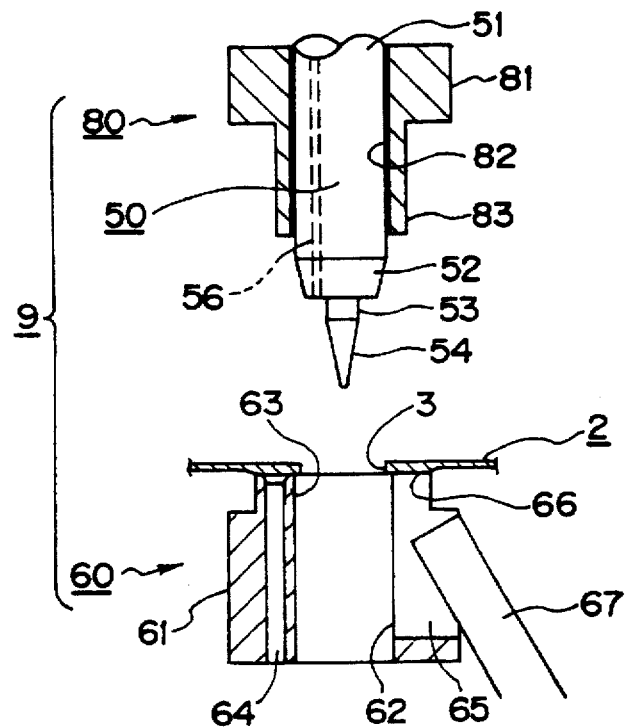
FIG. 21 illustrates the step of loading the disc substrate in a provisional holding state on a disc substrate setting surface of the lower jig member.

With the above-described assembling device 9 of the second embodiment, the upper jig 80 is raised with respect to the lower jig 60, as shown in FIG. 20. The distal end of the first guide portion 51 of the assembly guide member 50 is protruded and exposed via the guide opening 82 of the upper jig member 81. The disc substrate 2 is set on the disc substrate setting surface 63 of the lower jig member 61, as shown in FIG. 21. In such case, if suffices to set the disc substrate 2 on the disc substrate setting surface 63 so that the center opening 3 is in register with the clearance opening 62, while there is no necessity of precise position matching. The disc substrate 2, set on the disc substrate setting surface 63, is sucked and held on the disc substrate setting surface 63 via the suction opening 64 by actuating the vacuum suction device.

Figure 22:
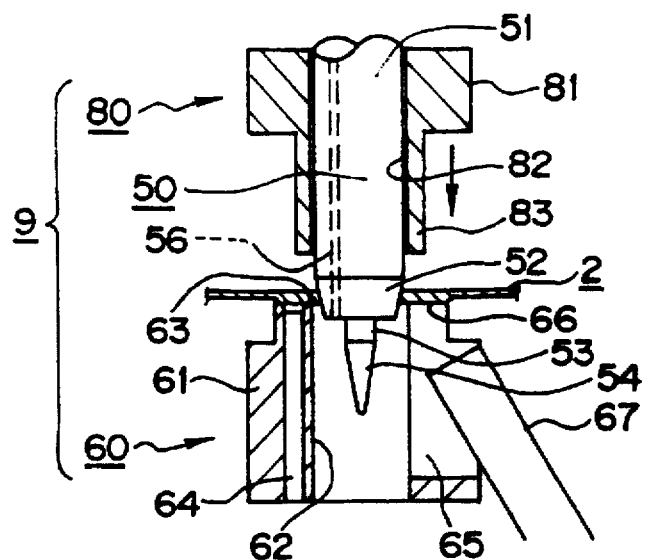
FIG. 22 illustrates the step of centering the disc substrate by an assembly guide member while the disc substrate is set on the disc substrate setting surface of the lower jig member in the assembling apparatus shown in FIG. 20.
Figure 23:
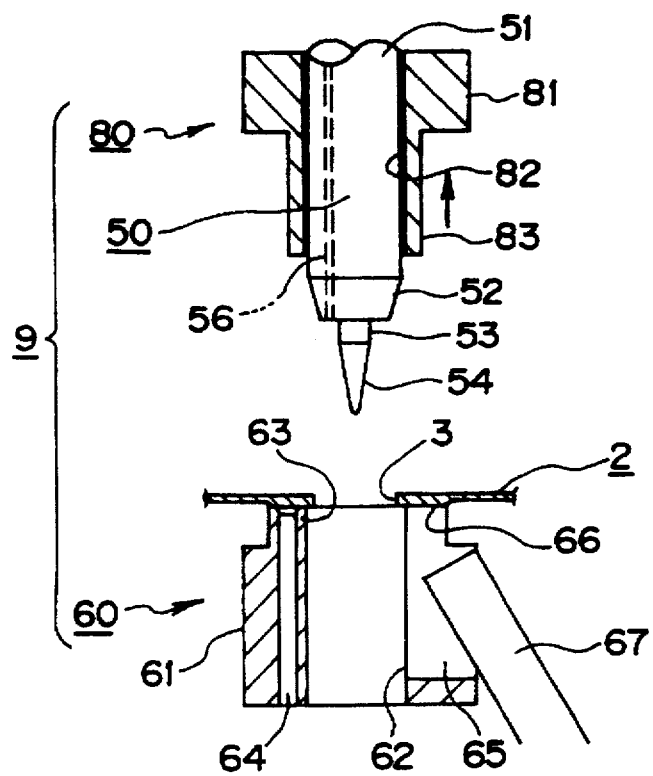
FIG. 23 illustrates the step of primary releasing of the disc substrate by upward movement of an upper jig member while keeping the disc substrate positioned on the disc setting surface of the lower jig member in the assembling apparatus shown in FIG. 20.

With the disc substrate 2 provisionally held on the lower jig 60, the upper jig 80 is lowered by driving means, not shown, as shown in FIG. 22. Thus the assembly guide member 50, built into the upper jig member 81, positions the disc substrate 2 by the first guide portion 51 being fitted into the center opening 3 of the disc substrate 2 on which the first guide portion 51 is held provisionally. The upper jig 80 is again raised by actuation of the driving means, as shown in FIG. 23. Although the fitting state of the first guide portion 51 of the assembly guide member 50 in the center opening 3 is canceled, the disc substrate 2 is sucked by vacuum suction means in position on the disc substrate setting surface 63 of the lower jig member 61. Although the process step is not shown, the UV curable adhesive is uniformly coated on the outer rim of the center opening 3 by the adhesive supplying unit, as described previously.

Figure 24:
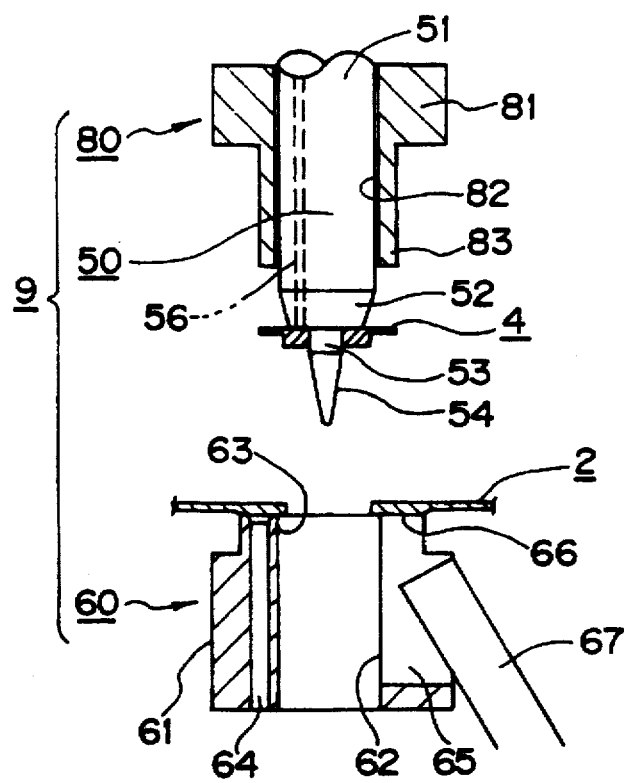
FIG. 24 illustrates the step of loading the hub on the assembly guide member in the assembling apparatus shown in FIG. 20.
Figure 25:
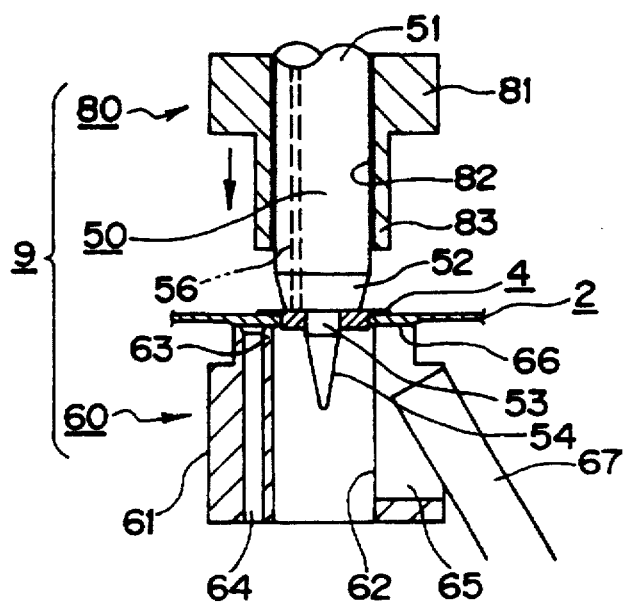
FIG. 25 illustrates the step of securing the hub to the disc substrate by the lowering of the upper jig member in the assembling apparatus shown in FIG. 20.
Figure 26:
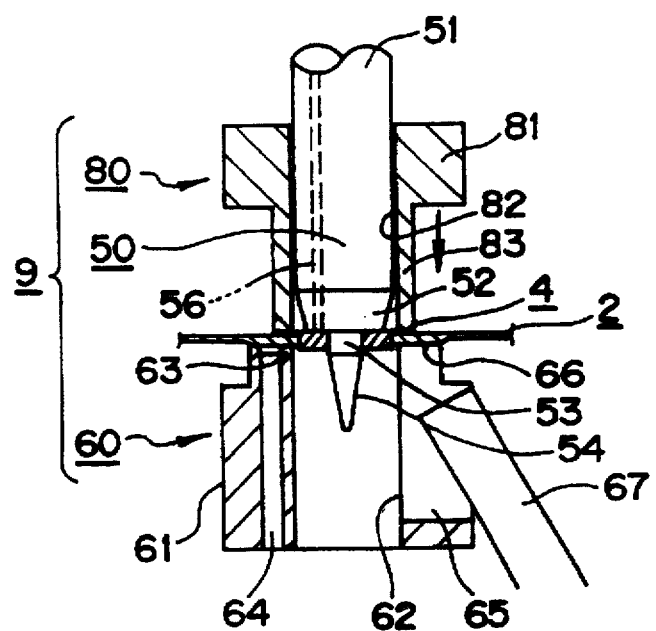
FIG. 26 illustrates the step of pressing the hub to the disc substrate by a hub pressing member of the upper jig member in the assembling apparatus shown in FIG. 20.
Figure 27:
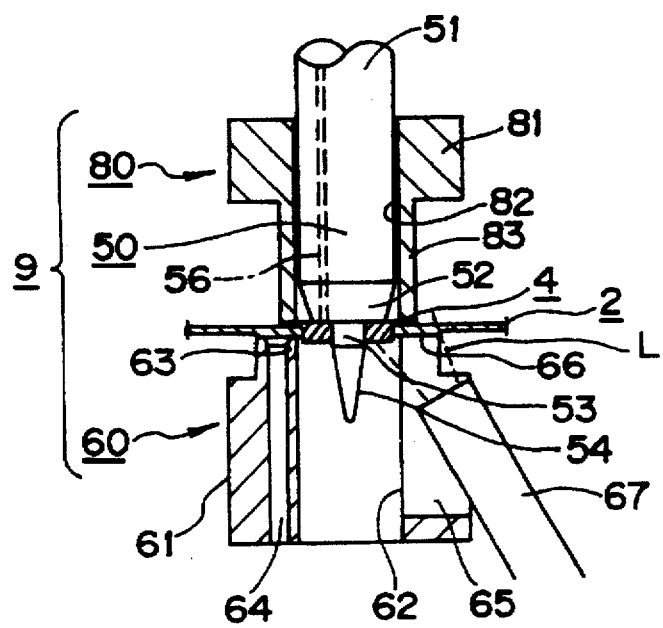
FIG. 27 illustrates the step of radiating a UV beam to the disc from a UV beam radiating unit mounted in the lower jig member in the assembling apparatus shown in FIG. 20.
Figure 28:
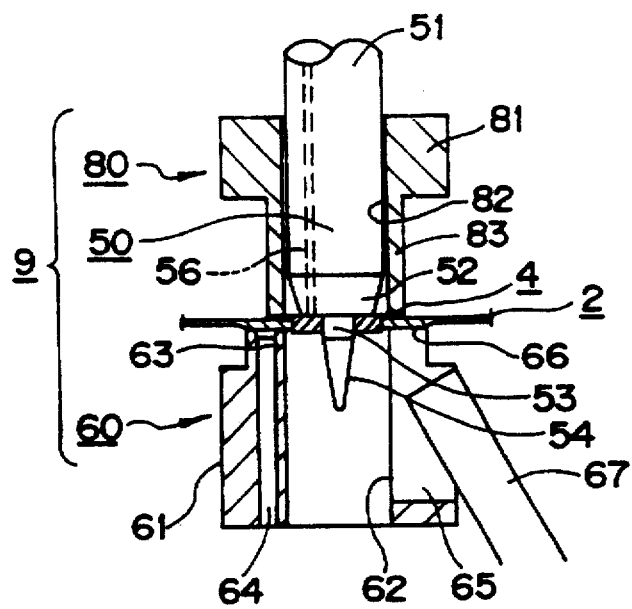
FIG. 28 illustrates the step of terminating the radiation of the UV beam from the UV beam radiating device to the disc substrate in the assembling apparatus shown in FIG. 20.
Figure 29:
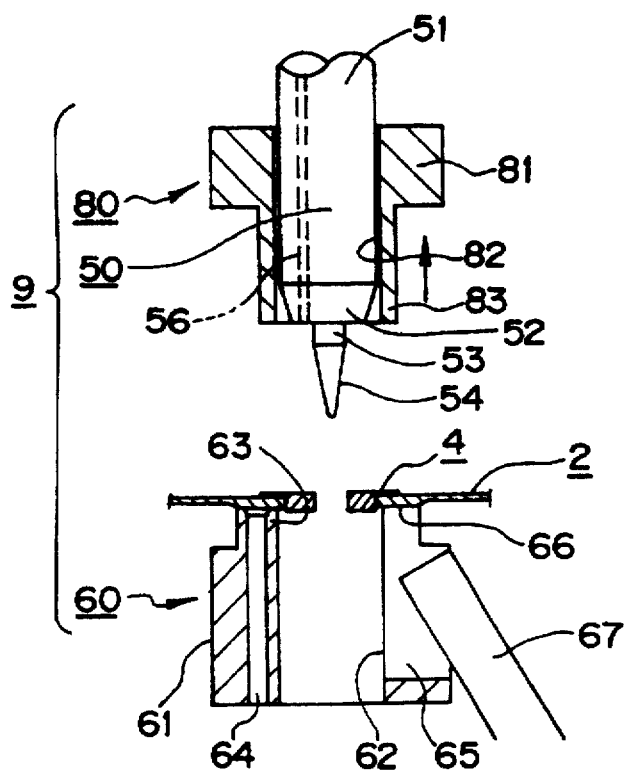
FIG. 29 illustrates the step of taking out the optical disc comprised of the disc substrate and the hub assembled together in the assembling apparatus shown in FIG. 20.
Figure 30:
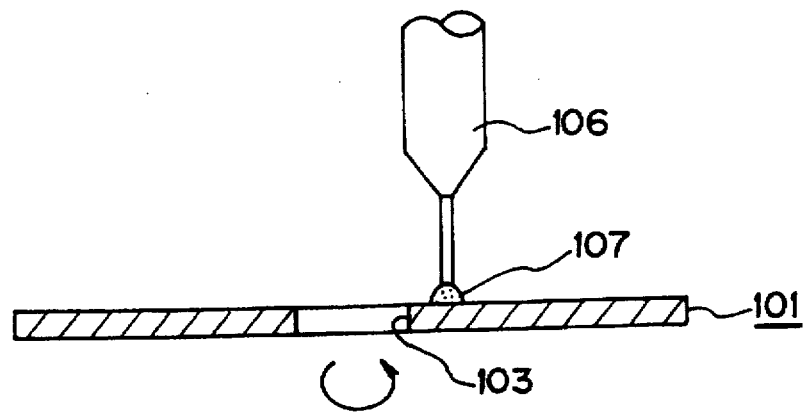
FIG. 30 illustrates the step of coating an adhesive in a conventional production process of a disk-shaped recording medium.
Figure 31:
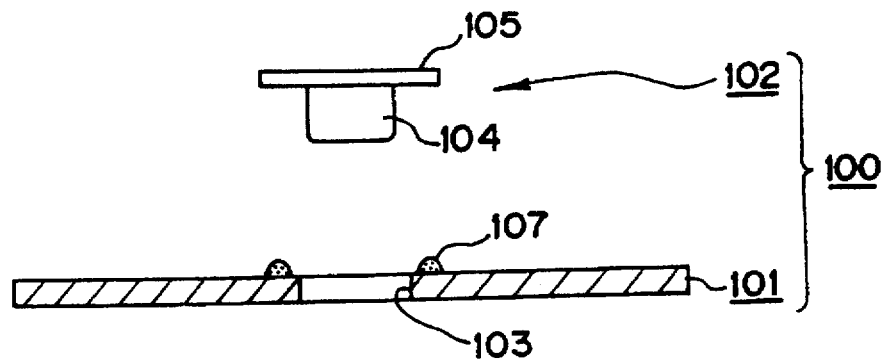
FIG. 31 illustrates the step of mounting a hub in the conventional production process of a disk-shaped recording medium.
Figure 32:
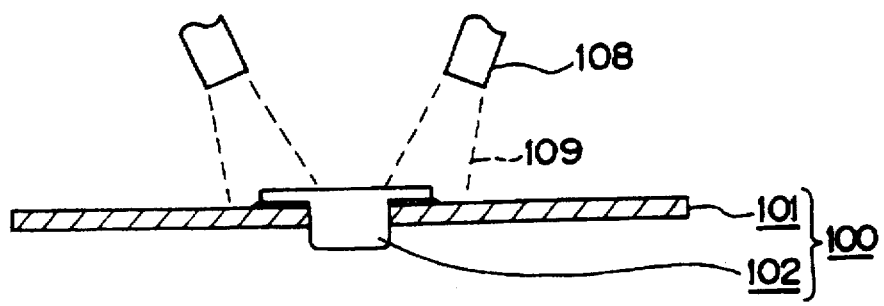
FIG. 32 illustrates the step of radiating a UV beam to the conventional optical disk.
Figure 33:
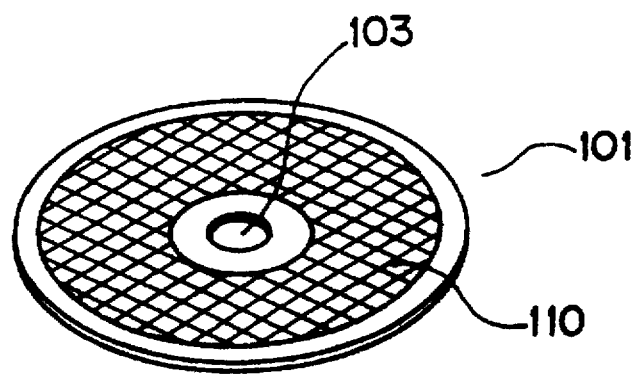
FIG. 33 is a perspective view showing the construction of a convention optical disk.
Figure 34:
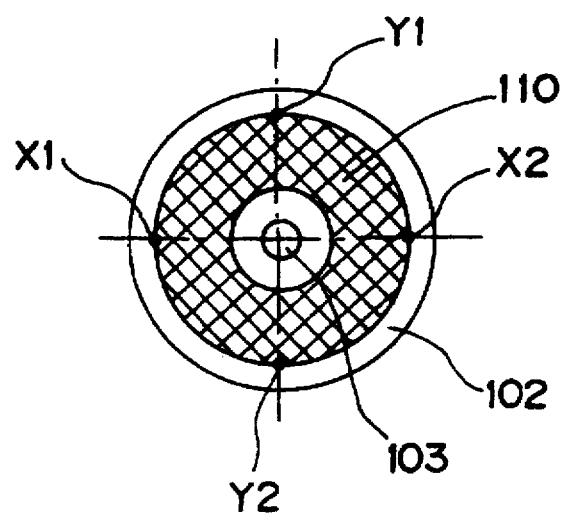
FIG. 34 is a plan view showing the conventional optical disk.
Figure 35:
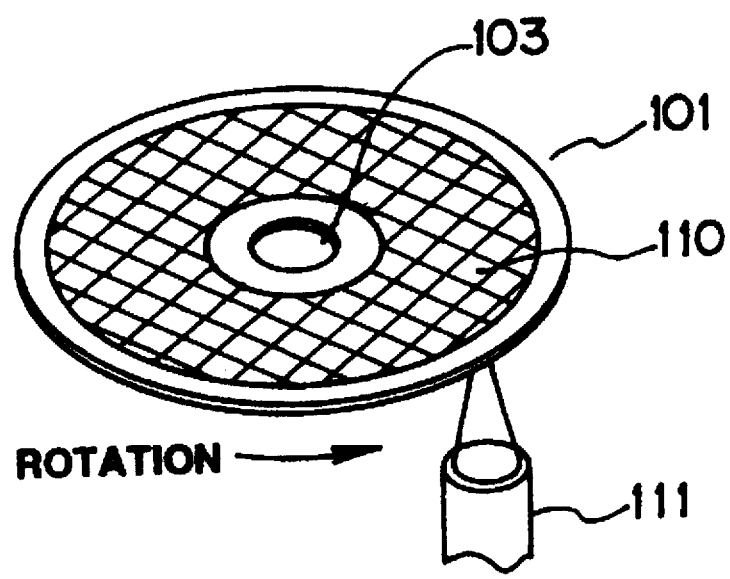

The hub 4 is assembled on the raised upper jig 80 by the second guide portion 53 of the assembly guide member 50 being fitted into the spindle shaft opening 7, as shown in FIG. 24. The hub 4 is sucked and held on the end face of the first guide portion 51 of the assembly guide member 50 via the suction opening 56, by actuation of the vacuum suction system, without the risk of detachment. The upper jig 80 is then lowered towards the lower jig 60 by actuation of driving means, not shown, as shown in FIG. 25. The hub 4 is assembled by being fitted into the center opening of the disc substrate 2 which is sucked and held in position by the above-described process on the disc substrate setting surface 63 of the lower jig member 61. The decent of the assembly guide member 50 is terminated when the disc substrate 2 and the hub 4 have been assembled together. However, the descent of the upper jig member 81 is continued. The upper jig member 81 thrusts the hub 4 against the major surface of the disc substrate 2 by the hub thrusting portion 83, as shown in FIG. 26. The disc substrate 2, carrying the hub 4, is irradiated with the UV light beam L from the UV radiating device 67 arranged in the UV light beam radiating unit 65 of the lower jig member 61. The UV light beam L is radiated on the outer rim of the center opening 3 of the disc substrate 2 via the UV light beam radiating port 66 opened on the disc substrate setting surface 63, as shown in FIG. 27. The UV curable adhesive, coated on the outer periphery of the center opening 3, is cured by irradiation with the UV light beam for positively securing the outer peripheral flange portion 6 of the hub 4 onto the major surface of the disc substrate 2 for completing the optical disc 1, as shown in FIG. 28.

When the disc substrate 2 and the hub 4 have been assembled together by the above process, the driving means, not shown, of the assembly device 9 is actuated for raising the upper jig 80 in its entirety, as shown in FIG. 27. By termination of the vacuum suction system, the optical disc 1, comprised of the disc substrate 2 and the hub 4 assembled together, is released from the state in which the disc is held under the force of suction on a disc substrate setting surface 63 of the lower jig 60, so as to be taken out of the assembly device 9.

What is claimed is:

1. A method for assembling a disc-shaped recording medium in which a hub is mounted on a disc substrate having an information recording area formed on at least one surface thereof and having a center opening, said hub having a fitting portion with a diameter substantially equal to a diameter of the center opening and a flange portion extending outwardly from said fitting portion, with a spindle shaft opening formed at a center of said fitting portion and adapted to be engaged by a disc drive spindle, wherein an assembly guide member is employed and is movable in a direction perpendicular to one major surface of the disc substrate and includes a first guide portion with a taper guide conical surface to be engaged in said center opening in the disc substrate, a second guide portion formed integrally with the first guide portion and having a longitudinal axis aligned with a distal end of said first guide portion, said second guide portion to be fitted in said spindle shaft opening in said hub, comprising the steps of:

arranging said disc substrate in position by inserting from a first side of said disc substrate said first guide portion of said assembly guide member in said center opening, wherein said first guide portion is inserted through said center opening so that said disc substrate is solely supported on said conical surface, thereby centering said disc surface with said longitudinal axis;

coating an adhesive on an outer rim formed around said center opening on a second side of said disc substrate;

assembling said hub from said second side of said disc substrate by fitting said hub on said second guide portion in said spindle shaft opening; and moving said assembly guide member in a direction perpendicular to said disc substrate away from said first side of said disc substrate and out of said center opening for fitting said fitting portion of said hub in said center opening of said disc substrate so that said flange portion of said hub is in contact with said adhesive.

2. The method for assembling a disc-shaped recording medium as claimed in claim 1, in which a lower jig member has a guide opening for mounting said assembly guide member for reciprocating movement along said longitudinal axis, with an end face thereof on which said guide opening is arranged forming a disc setting surface for said disc substrate, and an upper jig member movable towards and away from said lower jig member are employed, wherein said upper jig member has a tubular disc substrate holding portion mating with the outer periphery of said center opening and a hub thrusting portion mounted in a guide opening of said tubular disc substrate holding portion for mating with the flange portion of said hub, wherein the step of moving said assembly guide member further includes the steps of:

lowering said assembly guide member along said guide opening in said lower jig member for abutting said disc substrate assembled on said assembly guide member against the disc setting surface of said lower jig member and lowering said tubular disc substrate holding portion of said upper jig member towards said lower jig member for clamping said disc substrate between said tubular disk substrate holding portion and said disc setting surface;

lowering said assembly guide member further along said guide opening of said lower jig member for fitting said hub in said center opening of said disc substrate;

lowering said hub thrusting portion of said upper jig member towards said lower jig member for thrusting said flange portion of said hub to the outer rim of said center opening of said disc substrate; and raising said upper jig member relative to said lower jig member for taking out the assembled disc-shaped recording medium.

3. The method for assembling a disc-shaped recording medium as claimed in claim 2, in which the adhesive applied to the outer rim of the center opening of said disc substrate is a UV curable adhesive, the method comprising the further step of:

radiating a UV light beam onto the applied adhesive for setting the adhesive and securing said disc substrate and said hub to each other with said flange portion of said hub being thrust against the outer rim of the center opening of said disc substrate by said hub thrusting portion of said upper jig member.

4. A method for assembling a disc-shaped recording medium in which a hub is mounted on a disc substrate having an information recording area formed on at least one surface thereof and having a center opening, said hub having a fitting portion with a diameter substantially equal to a diameter of the center opening and a flange portion extending outwardly from said fitting portion, with a spindle shaft opening formed at a center of said fitting portion and adapted to be engaged by a disc drive spindle, in which an assembly guide member including a first guide portion with a taper guide conical surface to be engaged in said center opening in the disc substrate and a second guide portion formed integrally with the first guide portion and having a longitudinal axis aligned with a distal end of said first guide portion, said second guide portion to be fitted in said spindle shaft opening in said hub, a lower jig member with a longitudinal axis and an end face constructed as a disc substrate setting surface for supporting the outer rim of said center opening of said disc substrate; and an upper jig member movable towards and away from said lower jig member and having a guide opening in which said assembly guide member is mounted for reciprocating movement along said longitudinal axis are employed, and wherein an end face of the upper jig member on which said guide opening is located forms a hub thrusting portion for thrusting said flange portion of said hub against the outer rim of said center opening of said disk substrate, further comprising the steps of:

setting said disc substrate on said disc substrate setting surface of said lower jig member;

lowering said assembly guide member along said guide opening of said upper jig member for fitting said conical surface of said first guide portion in said center opening of said disc substrate for centering said disc substrate on said disc substrate setting surface;

raising said assembly guide member along said guide opening of said upper jig member;

fitting said second guide portion in said spindle shaft opening of said hub for assembling said hub to said assembly guide member;

coating an adhesive on an outer rim of said center opening of said disc substrate;

lowering said assembly guide member along said guide opening in said upper jig member for fitting said hub in said center opening of said disc substrate while lowering said hub thrusting portion towards said lower jig member for thrusting said flange portion of said hub by said hub thrusting portion against the adhesive coated on the outer rim of said center opening of said disc substrate; and raising said upper jig member relative to said lower jig member for taking out the assembled disc-shaped recording medium.

\* \* \* \* \*